(12) United States Patent
Ahn

(10) Patent No.: US 11,146,427 B2
(45) Date of Patent: Oct. 12, 2021

(54) TRANSITION DETECTOR AND CLOCK DATA RECOVERY UNIT INCLUDING THE SAME

(71) Applicant: Samsung Display Co., Ltd., Yongin-si (KR)

(72) Inventor: Jeong Keun Ahn, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 46 days.

(21) Appl. No.: 16/549,884

(22) Filed: Aug. 23, 2019

(65) Prior Publication Data

US 2020/0119955 A1  Apr. 16, 2020

(30) Foreign Application Priority Data

Oct. 11, 2018 (KR) ........................ 10-2018-0121383

(51) Int. Cl.
*H04L 25/03* (2006.01)
*H04L 25/02* (2006.01)
*H04B 3/32* (2006.01)
*H04L 25/08* (2006.01)

(52) U.S. Cl.
CPC ......... *H04L 25/03057* (2013.01); *H04B 3/32* (2013.01); *H04L 25/0292* (2013.01); *H04L 25/03885* (2013.01); *H04L 25/085* (2013.01)

(58) Field of Classification Search
CPC ........... H04L 25/03057; H04L 25/0292; H04L 25/03885; H04L 25/085; H04B 3/32

USPC ......................................................... 375/233
See application file for complete search history.

(56) References Cited

U.S. PATENT DOCUMENTS

| | | | |
|---|---|---|---|
| 6,970,500 B1 * | 11/2005 | Sanders ................ | H04B 1/707 375/150 |
| 9,288,087 B2 | 3/2016 | Shin et al. | |
| 2019/0074863 A1 | 3/2019 | Ahn | |

FOREIGN PATENT DOCUMENTS

| KR | 10-2013-0043562 A | 4/2013 |
|---|---|---|
| KR | 10-2019-0027983 A | 3/2019 |

* cited by examiner

*Primary Examiner* — Kevin M Burd
(74) *Attorney, Agent, or Firm* — Lewis Roca Rothgerber Christie LLP

(57) ABSTRACT

A transition detector includes a first integrator configured to provide a first integral signal by integrating a first training pattern signal according to a first compensation clock signal, a second integrator configured to provide a second integral signal by integrating the first training pattern signal according to a second compensation clock signal, and a third integrator configured to provide a third integral signal by integrating the first training pattern signal according to a third compensation clock signal, wherein occurrence of a transition of the first training pattern signal is detected when the first integral signal and the second integral signal are larger than, and the third integral signal is smaller than, a first reference voltage.

20 Claims, 16 Drawing Sheets

| | Odd Mode | Even Mode | Static Mode |
|---|---|---|---|
| CH1 | ⎾⎿ OR ⎿⎾ | ⎾⎿ OR ⎾⎿ | — OR ⎾ |
| CH2 | ⎿⎾ OR ⎾⎿ | ⎾⎿ OR ⎾⎿ | ⎾ OR ⎿ |

CH1

CH2

CH1

CH2

TRANSITION DETECTOR AND CLOCK DATA RECOVERY UNIT INCLUDING THE SAME

CROSS-REFERENCE TO RELATED APPLICATION

This application claims priority to, and the benefit of, Korean patent application 10-2018-0121383 filed on Oct. 11, 2018 in the Korean Intellectual Property Office, the entire disclosure of which is incorporated herein by reference.

BACKGROUND

1. Field

The present disclosure generally relates to a transition detector and a clock data recovery unit including the same.

2. Related Art

Major noise that causes degradation of a signal in a transmitting/receiving system, in which a transmitter and a receiver are connected to each other through a single channel, is inter-symbol interface (ISI).

In addition to the ISI, crosstalk-induced jitter (CIJ) further occurs in a high-speed parallel link system in which a transmitter and a receiver are connected to each other through a plurality of channels.

Because a plurality of clock data recovery units respectively corresponding to the plurality of channels are used in the receiver, a wide chip area necessary for the clock data recovery units is used, and power consumption and construction cost increase.

The clock data recovery unit may use a transition detector to recover a clock signal. A conventional transition detector uses digital data to detect a transition. Therefore, the conventional transition detector may detect only a specific unit interval (UI) instead of a specific time at which a transition occurs, and hence there may be a limitation in recovering a clock signal strong against ISI and CIJ.

SUMMARY

Embodiments disclosed herein provide a transition detector capable of recovering a clock signal strong against inter-symbol interference and crosstalk-induced jitter, and a clock data recovery unit including the transition detector.

According to an aspect of the present disclosure, there is provided a transition detector including a first integrator configured to provide a first integral signal by integrating a first training pattern signal according to a first compensation clock signal, a second integrator configured to provide a second integral signal by integrating the first training pattern signal according to a second compensation clock signal, and a third integrator configured to provide a third integral signal by integrating the first training pattern signal according to a third compensation clock signal, wherein occurrence of a transition of the first training pattern signal is detected when the first integral signal and the second integral signal are larger than, and the third integral signal is smaller than, a first reference voltage.

The second compensation clock signal may have a phase that is further delayed than that of the first compensation clock signal, and the third compensation clock signal may have a phase that is further delayed than that of the second compensation clock signal.

The transition detector may further include a first comparator configured to output a logic value of 1 when the first integral signal is larger than the first reference voltage, and to output a logic value of 0 when the first integral signal is smaller than the first reference voltage, a second comparator configured to output the logic value of 1 when the second integral signal is larger than the first reference voltage, and to output the logic value of 0 when the second integral signal is smaller than the first reference voltage, and a third comparator configured to output the logic value of 1 when the third integral signal is larger than the first reference voltage, and to output the logic value of 0 when the third integral signal is smaller than the first reference voltage.

The transition detector may further include a first NAND gate configured to receive output values of the first comparator and the second comparator, and a first NOR gate configured to receive output values of the first NAND gate and the third comparator.

The transition detector may further include a first inverter configured to output a first detection signal by inverting an output value of the first NOR gate.

The transition detector may further include a first mode signal maintainer configured to provide a first mode signal of a training mode corresponding to an initialization signal having a turn-on level, and configured to provide the first mode signal of a normal mode corresponding to the first detection signal having a first turn-on level after the initialization signal having the turn-on level is supplied, and to then maintain the first mode signal of the normal mode regardless of a change in level of the first detection signal.

The first mode signal maintainer may include a first transistor having a gate electrode configured to receive the first detection signal, one electrode connected to a first power source, and another electrode connected to a first sensing node, a second transistor having one electrode connected to the first power source, and another electrode connected to the first sensing node, a third transistor having a gate electrode configured to receive the initialization signal, one electrode connected to the first sensing node, and another electrode connected to a second power source, and a second inverter having an input end connected to the first sensing node, and an output end connected to a gate electrode of the second transistor.

The first mode signal maintainer may further include a third inverter having an input end connected to the first sensing node, and a fourth inverter having an input end connected to an output end of the third inverter, and configured to output the first mode signal.

The transition detector may further include a fourth integrator configured to provide a fourth integral signal by integrating a second training pattern signal according to the first compensation clock signal, a fifth integrator configured to provide a fifth integral signal by integrating the second training pattern signal according to the second compensation clock signal, and a sixth integrator configured to provide a sixth integral signal by integrating the second training pattern signal according to the third compensation clock signal, wherein occurrence of a transition of the second training pattern signal is detected when the fourth integral signal and the fifth integral signal are smaller than, and the sixth integral signal is larger than, a second reference voltage.

The transition detector may further include a fourth comparator configured to output the logic value of 1 when the fourth integral signal is larger than the second reference voltage, and to output the logic value of 0 when the fourth integral signal is smaller than the second reference voltage, a fifth comparator configured to output the logic value of 1 when the fifth integral signal is larger than the second reference voltage, and to output the logic value of 0 when the fifth integral signal is smaller than the second reference voltage, and a sixth comparator configured to output the logic value of 1 when the sixth integral signal is larger than the second reference voltage, and to output the logic value of 0 when the sixth integral signal is smaller than the second reference voltage.

The transition detector may further include a second NOR gate configured to receive output values of the fourth comparator and the fifth comparator, and a second NAND gate configured to receive output values of the second NOR gate and the sixth comparator, and to output a second detection signal.

The transition detector may further include a second mode signal maintainer configured to provide a second mode signal of the training mode, corresponding to the initialization signal having the turn-on level, and configured to provide the second mode signal of the normal mode corresponding to the second detection signal having a first turn-on level after the initialization signal having the turn-on level is supplied, and to then maintain the second mode signal of the normal mode regardless of a change in level of the second detection signal.

The second mode signal maintainer may include a fourth transistor having a gate electrode configured to receive the second detection signal, one electrode connected to the first power source, and another electrode connected to a second sensing node, a fifth transistor having one electrode connected to the first power source, and another electrode connected to the second sensing node, a sixth transistor having a gate electrode configured to receive the initialization signal, one electrode connected to the second sensing node, and another electrode connected to the second power source, and a fifth inverter having an input end connected to the second sensing node, and an output end connected to a gate electrode of the fifth transistor.

The second mode signal maintainer may further include a sixth inverter having an input end connected to the second sensing node, and a seventh inverter having an input end connected to an output end of the sixth inverter, and configured to output the second mode signal.

The first training pattern signal may include a falling pulse during 1 unit interval in one period, and may maintain a high level during other unit intervals in the one period, and the second training pattern signal may include a rising pulse during 1 unit interval in one period, and maintains a low level during the other unit intervals in the one period.

The first training pattern signal may include a falling pulse during 1 unit interval in one period, and the second training pattern signal may include a rising pulse during 1 unit interval in one period.

According to another aspect of the present disclosure, there is provided a clock data recovery unit including a first integrator configured to provide a first integral signal by integrating a first training pattern signal according to a first compensation clock signal, a second integrator configured to provide a second integral signal by integrating the first training pattern signal according to a second compensation clock signal having a phase further delayed than that of the first compensation clock signal, and a third integrator configured to provide a third integral signal by integrating the first training pattern signal according to a third compensation clock signal having a phase further delayed than that of the second compensation clock signal, wherein the phase of the third compensation clock signal is stored as a first phase when the first integral signal and the second integral signal are larger than, and the third integral signal is smaller than, a first reference voltage.

The clock data recovery unit may further include a fourth integrator configured to provide a fourth integral signal by integrating a second training pattern signal according to the first compensation clock signal, a fifth integrator configured to provide a fifth integral signal by integrating the second training pattern signal according to the second compensation clock signal, and a sixth integrator configured to provide a sixth integral signal by integrating the second training pattern signal according to the third compensation clock signal, wherein the phase of the third compensation clock signal is stored as a second phase when the fourth integral signal and the fifth integral signal are smaller than, and the sixth integral signal is larger than, a second reference voltage.

The third compensation clock signal may have a phase, which is further delayed one among the first phase and the second phase. The third compensation clock signal may be provided as a sampling clock signal.

The first training pattern signal may include a falling pulse during 1 unit interval in one period, and may maintain a high level during other unit intervals in the one period, and the second training pattern signal may include a rising pulse during 1 unit interval in one period, and maintains a low level during the other unit intervals in the one period.

BRIEF DESCRIPTION OF THE DRAWINGS

In the drawing figures, dimensions may be exaggerated for clarity of illustration. Like reference numerals refer to like elements throughout.

DETAILED DESCRIPTION

Figure 1:
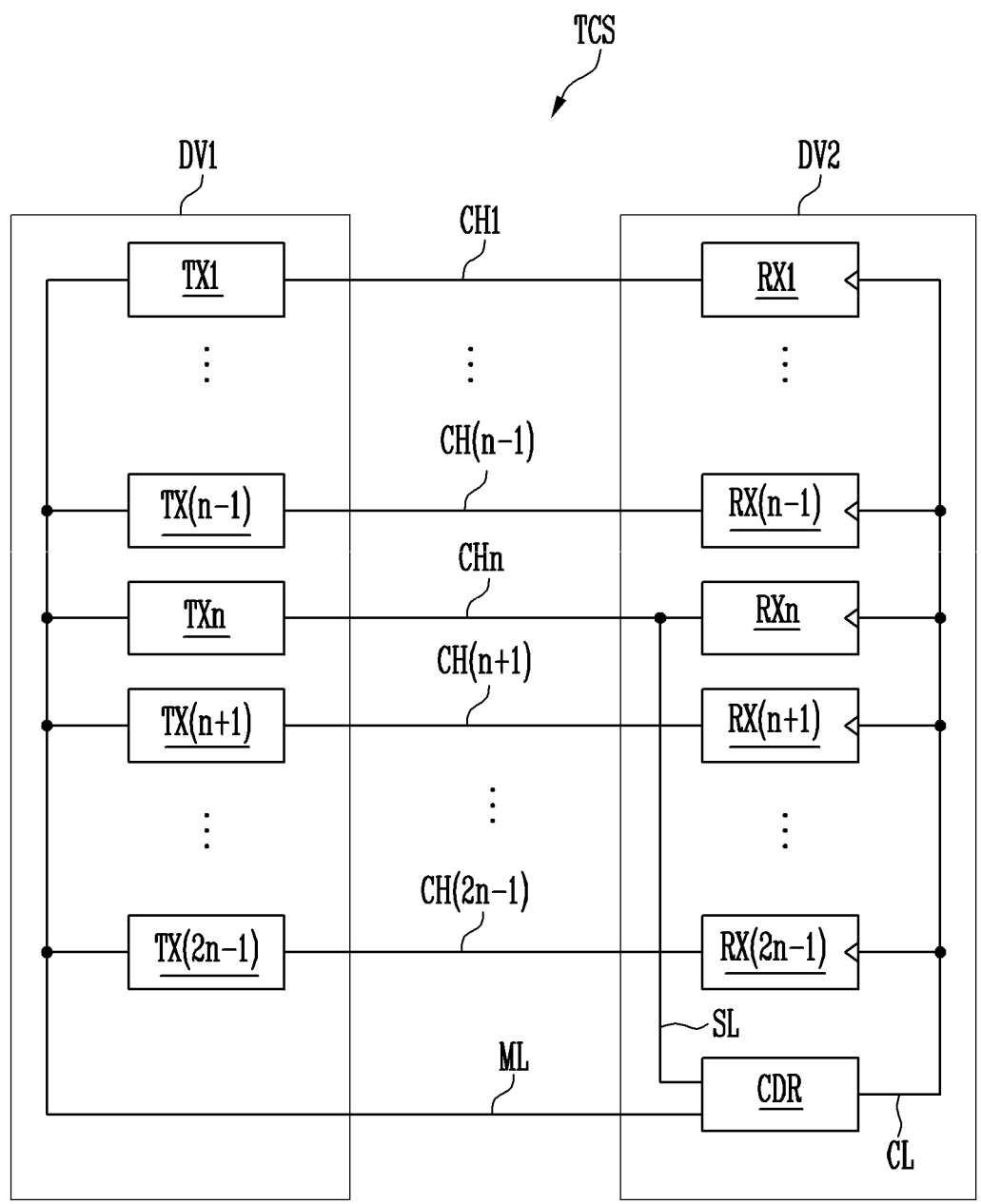
FIG. 1 is a diagram illustrating a receiver and a transceiver including the same according to an embodiment of the present disclosure.

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a receiver and a transceiver including the same according to an embodiment of the present disclosure.

Referring to FIG. 1, the transceiver TCS according to the embodiment of the present disclosure includes a transmitter DV1 and a receiver DV2.

The transmitter DV1 includes transmitting units TX1 to TX(2n−1) connected to corresponding channels CH1 to CH(2n−1).

The receiver DV2 includes receiving units RX1 to RX(2n−1) connected to the corresponding channels CH1 to CH(2n−1).

Also, the receiver DV2 includes a clock data recovery unit CDR. The clock data recovery unit CDR may be connected to a sensing channel CHn among the channels CH1 to CH(2n−1) through a sensing line SL, and may be connected to the receiving units RX1 to RX(2n−1) through a clock line CL. In some embodiments, the clock data recovery unit CDR may be connected to the transmitting units TX1 to TX(2n−1) through a mode line ML.

The transceiver TCS may operate in one of a training mode and a normal mode. The training mode is a mode in which the clock data recovery unit CDR generates a sampling clock signal, and the normal mode is a mode for sampling data signals, using the generated sampling clock signal. Training pattern signals may be transmitted through the channels CH1 to CH(2n−1) during the training mode, and data signals may be transmitted through the channels CH1 to CH(2n−1) during the normal mode.

First, the training mode will be described.

In an embodiment, in the training mode, the receiving units RX1 to RX(2n−1) may receive training pattern signals having the same transition direction through the channels CH1 to CH(2n−1).

In the training mode, the clock data recovery unit CDR may generate a sampling clock signal of which phase is adjusted such that a transition time of a training pattern signal of the sensing channel CHn corresponds to a sampling time. In some embodiments, when the sampling clock signal is generated, the clock data recovery unit CDR may provide a mode signal corresponding to the normal mode through the mode line ML.

In another embodiment, in the training mode, the receiving units RX1 to RX(2n−1) may receive first training pattern signals having a same first transition direction, and second training pattern signals having a same second transition direction, through the channels CH1 to CH(2n−1). The first transition direction and the second transition direction may be different from each other.

In the training mode, the clock data recovery unit CDR may generate a sampling clock signal to correspond to a further delayed phase between a first sampling time, which corresponds to a first transition time of a first training pattern signal of the sensing channel CHn, and a second sampling time corresponding to a second transition time of a second training pattern signal of the sensing channel CHn.

Hereinafter, the normal mode will be described.

When a mode signal corresponding to the normal mode is received, the transmitting units TX1 to TX(2n−1) may respectively provide data signals through the corresponding channels CH1 to CH(2n−1).

In the normal mode, the clock data recovery unit CDR may supply a sampling clock signal to the receiving units RX1 to RX(2n−1) through the clock line CL.

In the normal mode, the receiving units RX1 to RX(2n−1) may respectively sample the data signals received through the corresponding channels CH1 to CH(2n−1), using the sampling clock signal.

According to the present embodiment, clock data recovery units respectively corresponding to the plurality of channels CH1 to CH(2n−1) are not required, and only a single clock data recovery unit CDR corresponding to the sensing channel CHn may be used. Thus, a narrower chip area can be used, and power consumption can be reduced.

The fact that there is no problem in data sampling, even when a sampling clock signal with respect to the plurality of channels CH1 to CH(2n−1) is generated based on one sensing channel CHn, will be described later with reference to FIGS. 11 to 14.

It may be useful to determine the sensing channel CHn among the plurality of CH1 to CH(2n−1). According to an embodiment, the sensing channel CHn may be a channel that receives a reception signal having a slowest phase with respect to the same transmission signals among the channels CH1 to CH(2n−1). According to another embodiment, the sensing channel CHn may be a channel located at the most medium position (e.g., at a center) among the channels CH1 to CH(2n−1).

Here, n may be a natural number of 2 or more. However, although a case where the last channel CH(2n−1) is a (2n−1)th channel (i.e., is an odd-numbered channel) is illustrated in FIG. 1, the present embodiment may be applied even when the last channel is an even-numbered channel (e.g., the last channel may be a 2nth channel). For example, when the sensing channel CHn is a fourth channel, the last channel may be an eighth channel. In addition, when the last channel is the eighth channel, the sensing channel CHn may be a fifth channel.

That is, when the sensing channel CHn of the present embodiment is determined, it may be useful to determine the order of priority of the sensing channel CHn. Also, it may be useful to determine, as the sensing channel CHn, a channel that receives a reception signal having the slowest phase with respect to the same transmission signals among the channels CH1 to CH(2n−1).

When the channels CH1 to CH(2n−1) are provided in a physical structure in which they are simply located in parallel on a plane, the sensing channel CHn may be a channel located at the most medium position among (e.g., the middle of) the channels CH1 to CH(2n−1). However, when the channels CH1 to CH(2n−1) are provided in a stereoscopic structure (e.g., when a plurality of channels exist as a bundle in a wire sheath), a manufacturer may detect a channel that receives a reception signal having the slowest phase in a manner that transmits sample training signals in advance, and may determine the detected channel as the sensing channel CHn. That is, the sensing channel CHn may be differently determined for every product.

According to the present embodiment, the fact that crosstalk-induced jitter can be effectively solved will be described later with reference to FIGS. 6 to 14, and the fact that inter-symbol interference can be effectively solved will be described later with reference to FIGS. 17 to 22.

Figure 2:
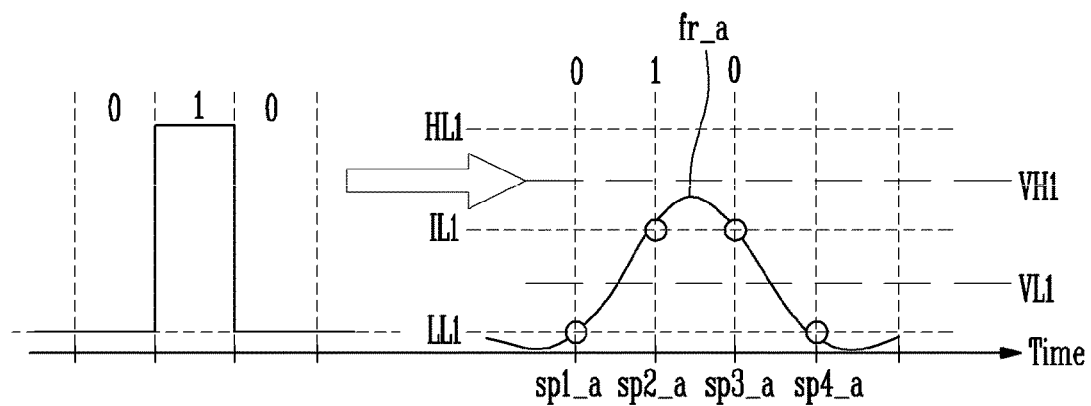
FIG. 2 is a diagram illustrating a reception signal with respect to a transmission signal.
Figure 3:
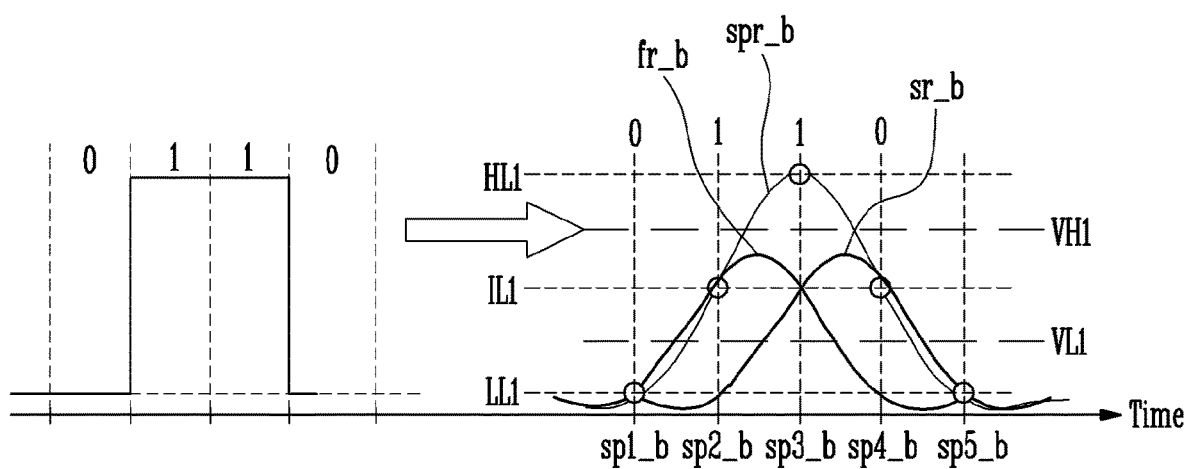
FIG. 3 is a diagram illustrating a reception signal with respect to another transmission signal.

FIG. 2 is a diagram illustrating a reception signal with respect to a transmission signal. FIG. 3 is a diagram illustrating a reception signal with respect to another transmission signal.

In FIGS. 2 and 3, a case where crosstalk-induced jitter does not exist is assumed. In FIGS. 2 and 3, the interval between adjacent sampling times is referred to as a unit interval (UI).

In FIGS. 2 and 3, a changeable level of a reception signal may be one of no less than a lowest level LL1 and no more than a highest level HL1. An intermediate level IL1 exists between the lowest level LL1 and the highest level HL1. In the present example, it is assumed that a channel through which the reception signal passes is ideal. The difference between an ideal channel and an actual channel is described in relation to FIGS. 17 and 22.

Referring to FIG. 2, there is illustrated a reception signal fr_a of the receiver DV2, which passes through an arbitrary channel, when the transmitter DV1 transmits a transmission signal of which binary level is 0, 1, 0 through the channel. A case where the other data of the transmission signal (e.g., before and after 0, 1, 0), which are not shown in FIG. 2, have a binary level of 0 is assumed.

The shape of the reception signal fr_a shown in FIG. 2 may be acquired when the channel is designed a low pass filter. Therefore, according to an embodiment, each of the plurality of channels CH1 to CH(2n−1) connecting the transmitter DV1 and the receive DV2 may be designed as a low pass filter.

The reception signal following a response shape shown in FIG. 2 may be referred to as a duo-binary signal. The response shape shown in FIG. 2 may be obtained even when the transmitter DV1 includes an encoder for duo-binary signaling, in addition to when the channel is designed as a low pass filter.

There are various duo-binary signaling methods. However, in general, in the case of the reception signal fr_a of FIG. 2, a cursor of a sampling time (e.g., sampling moment) sp1_a becomes a pre-cursor, a cursor of a sampling time sp2_a becomes a main cursor, a cursor of a sampling time sp3_a becomes a first post-cursor, and a cursor of a sampling time sp4_a becomes a second post-cursor. Various known methods may be used such that a level (magnitude) of the main cursor is equal to that of the first post-cursor so as to properly apply the duo-binary signaling.

Referring to FIG. 3, there is illustrated a reception signal spr_b of the receiver DV2, which passes through an arbitrary channel, when the transmitter DV1 transmits a transmission signal of which binary level is 0, 1, 1, 0 through the channel. A case where the other data of the transmission signal (e.g., before and after 0, 1, 1, 0), which are not shown in FIG. 3, have the binary level 0 is assumed.

In FIG. 3, the reception signal spr_b may be an overlapping signal of a response signal fr_b corresponding to first binary level 1 and a response signal sr_b corresponding to second binary level 1. In general, in the case of the response signal fr_b, a cursor of a sampling time sp1_b becomes a pre-cursor, a cursor of a sampling time sp2_b becomes a main cursor, a cursor of a sampling time sp3_b becomes a first post-cursor, and a cursor of a sampling time sp4_b becomes a second post-cursor. In general, in the case of the response signal sr_b, a cursor of the sampling time sp2_b becomes a pre-cursor, a cursor of the sampling time sp3_b becomes a main cursor, a cursor of the sampling time sp4_b becomes a first post-cursor, and a cursor of a sampling time sp5_b becomes a second post-cursor.

Hereinafter, a decoding method for a duo-binary signal will be described with reference to FIGS. 2 and 3.

A determination value of 1UI previous data (e.g., data of an immediately preceding signal received during a previous unit interval UI, or data the most recently received binary value of a signal) may be used when decoding on a duo-binary signal is performed. When the determination value of the 1UI previous data is 1, a first reference voltage VH1 may be used when current data is determined. Also, when the determination value of the 1UI previous data is 0, a second reference voltage VL1 may be used when the current data is determined. The first reference voltage VH1 may have an intermediate value of the highest level HL1 and the intermediate level IL1 among the changeable levels of the reception signal. The second reference voltage VL1 may have an intermediate value of the lowest level LL1 and the intermediate level IL1 among the changeable levels of the reception signal.

In an example, referring to FIG. 2, because the determination value of the 1UI previous data is 0 at the sampling time sp2_a, the binary level of the current data may be determined based on the second reference voltage VL1. The level of the reception signal sampled at the sampling time sp2_a is the intermediate level IL1 that is higher than the second reference voltage VL1. Therefore, the binary level of the current data may be determined as 1.

Next, referring to FIG. 2, because the determination of the 1UI previous data is 1 at the sampling time sp3_a, the binary level of the current data may be determined based on the first reference voltage VH1. The level of the reception signal sampled at the sampling time sp3_a is the intermediate level IL1 that is lower than the first reference voltage VH1. Therefore, the binary level of the current data may be determined as 0.

In another example, referring to FIG. 3, because the determination of the 1UI previous data is 0 at the sampling time sp2_b, the binary level of the current data may be determined based on the second reference voltage VL1. The level of the reception signal sampled at the sampling time sp2_b is the intermediate level IL1 that is higher than the second reference voltage VL1. Therefore, the binary level of the current data may be determined as 1.

Next, referring to FIG. 3, because the determination of the 1UI previous data is 1 at the sampling time sp3_b, the binary level of the current data may be determined based on the first reference voltage VH1. The level of the reception signal sampled at the sampling time sp3_b is the highest level HL1 that is higher than the first reference voltage VH1. Therefore, the binary level of the current data may be determined as 1.

Next, referring to FIG. 3, because the determination of the 1UI previous data is 1 at the sampling time sp4_b, the binary level of the current data may be determined based on the first reference voltage VH1. The level of the reception signal sampled at the sampling time sp4_b is the intermediate level IL1 that is lower than the first reference voltage VH1. Therefore, the binary level of the current data may be determined as 0.

Figures 4, 5:
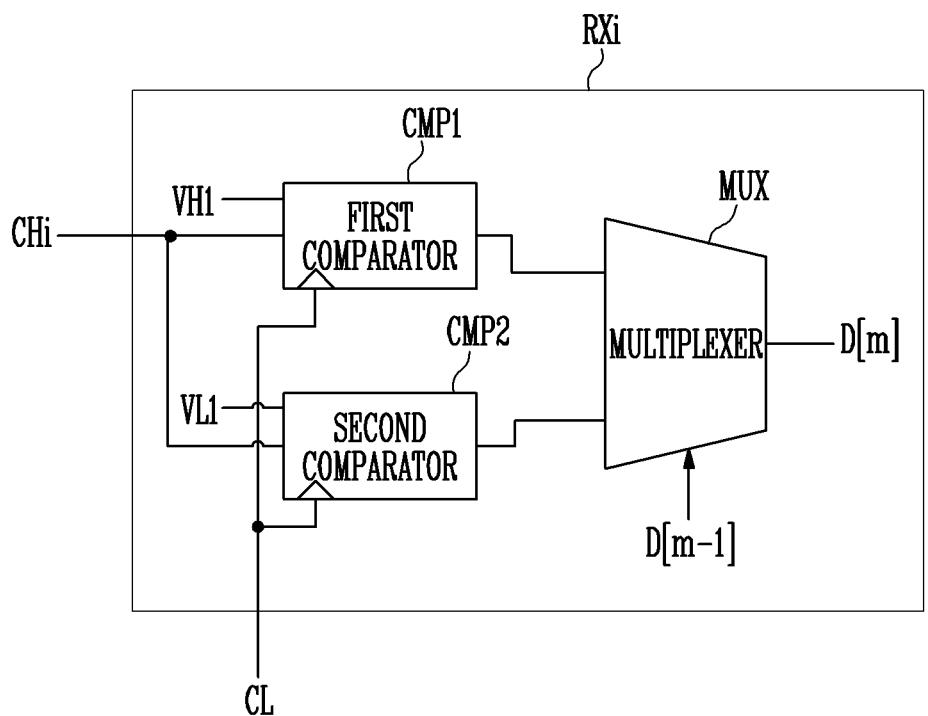
FIG. 4 is a diagram illustrating a receiving unit according to an embodiment of the present disclosure.
FIG. 5 is a diagram illustrating a mode according to a relationship between an adjacent reception signal of an adjacent channel and a reception signal of a target channel.

A configuration obtained by specifically implementing the above-described determination method according to an embodiment is a receiving unit RXi according to FIG. 4.

FIG. 4 is a diagram illustrating a receiving unit according to an embodiment of the present disclosure.

Although the receiving unit RXi is illustrated based on an ith channel CHi in FIG. 4, the same contents may be applied to another channel and another receiving unit. Here, i may be a natural number. When the ith cannel CHi is the sensing channel CHn, the receiving unit RXi may be further connected to the sensing line SL.

Referring to FIG. 4, the receiving unit RXi may include a first comparator CMP1, a second comparator CMP2, and a multiplexer MUX.

The first comparator CMP1 may provide a logic value by comparing a reception signal and the first reference voltage VH1 according to a sampling clock signal supplied through the clock line CL. The first comparator CMP1 may compare the reception signal with the first reference voltage VH1 by sampling the magnitude of the reception signal at a sampling time when the first comparator CMP1 operates according to a rising transition or falling transition of the sampling clock signal.

In another embodiment, the first comparator CMP1 may compare the reception signal with the first reference voltage VH1 using the magnitude of the reception signal integrated in a high level period or low level period of the sampling clock signal. The first comparator CMP1 may provide the logic value having a high level when the reception signal is larger than the first reference voltage VH1, and may provide the logic value having a low level when the reception signal is smaller than the first reference voltage VH1.

The second comparator CMP2 may provide a logic value by comparing the reception signal and the second reference voltage VL1 according to the sampling clock signal. The reception signal may be received through the channel Chi. The second comparator CMP2 may compare the reception signal with the second reference voltage VL1 by sampling the magnitude of the reception signal at a sampling time when the second comparator CMP2 operates according to the rising transition or falling transition of the sampling clock signal. In another embodiment, the second comparator CMP2 may compare the reception signal with the second reference voltage VL1 using the magnitude of the reception signal integrated in the high level period or low level period of the sampling clock signal. The second comparator CMP2 may provide the logic value having the high level when the reception signal is larger than the second reference voltage VL1, and may provide the logic value having the low level when the reception signal is smaller than the second reference voltage VL1.

The multiplexer MUX may output, as current data D[m], one of output values of the first comparator CMP1 and the second comparator CMP2. The multiplexer MUX may select one of the output values of the first comparator CMP1 and the second comparator CMP2, based on past data D[m−1] before 1UI, and may output the selected output value as the current data D[m].

For example, when the past data D[m−1] has a binary level of 1, the output value of the first comparator CMP1 may be output as the current data D[m]. On the other hand, when the past data D[m−1] has the binary level 0, the output value of the second comparator CMP2 may be output as the current data D[m]. When the output value of the multiplexer MUX is a logic value having the high level, the binary level of the current data D[m] may be 1. When the output value of the multiplexer MUX is a logic value having the low level, the binary level of the current data D[m] may be 0.

FIG. 5 is a diagram illustrating a mode according to a relationship between an adjacent reception signal of an adjacent channel and a reception signal of a target channel.

When crosstalk-induced jitter is described, a target channel is referred to as a victim channel, and an adjacent channel that has bad influence on the victim channel is referred to an aggressor channel. In this description, the victim channel as the target channel is assumed as a channel CH2, and the aggressor channel is assumed as a channel CH1.

Meanwhile, crosstalk-induced jitter that is induced in the channel CH2 may have bad influence on the channel CH1, and the bad influence may return to the channel CH2. The influence is relatively insignificant, and description thereof may be excessively complicated. Therefore, further detailed description will be omitted.

A case where transition directions of the victim channel CH2 and the aggressor channel CH1 are different from each other is referred to as an odd mode. Two cases may exist as shown in FIG. 5.

A case where the transition directions of the victim channel CH2 and the aggressor channel CH1 are equal to each other is referred to as an even mode. Two cases may exist as shown in FIG. 5.

On the other hand, a case where no transition exists in a channel is referred to as a static mode. In FIG. 5, no transition exists in the aggressor channel CH1 regardless of the transition direction of the victim channel CH2. Therefore, two cases may exist as shown in FIG. 5.

Figure 6:
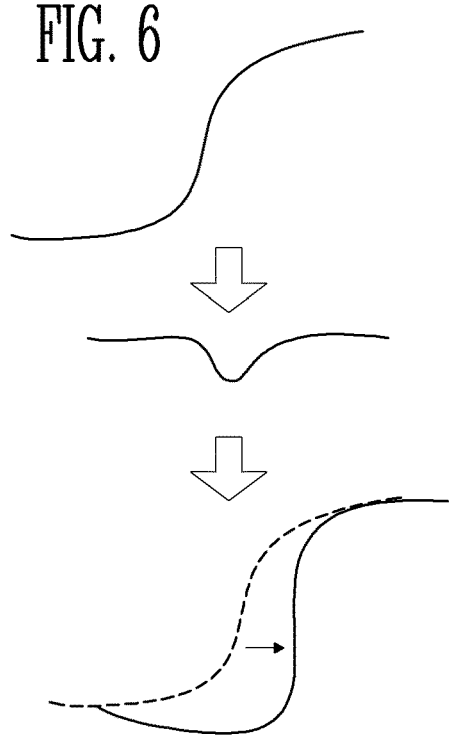
FIG. 6 is a diagram illustrating an example of crosstalk-induced jitter caused by an adjacent reception signal.
Figure 7:
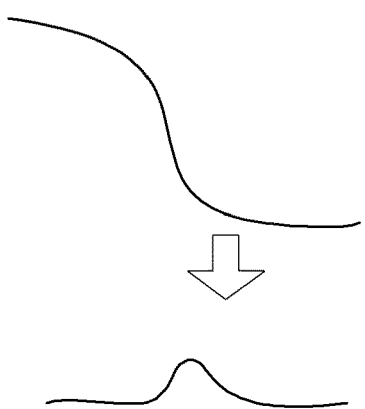
FIG. 7 is a diagram illustrating another example of the crosstalk-induced jitter caused by the adjacent reception signal.
Figure 7:
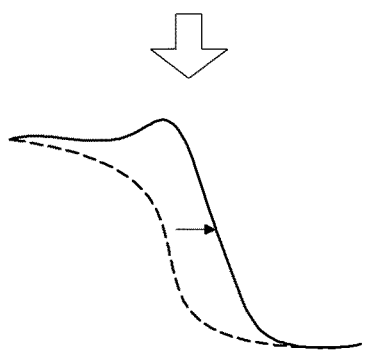

FIG. 6 is a diagram illustrating an example of crosstalk-induced jitter caused by an adjacent reception signal. FIG. 7 is a diagram illustrating another example of the crosstalk-induced jitter caused by the adjacent reception signal.

Referring to FIG. 6, there is illustrated an even mode in which a rising transition occurs in both the victim channel CH2 and the aggressor channel CH1.

When a rising transition occurs in the aggressor channel CH1, a voltage drop occurs in the victim channel CH2 in the lower direction that is the opposite direction of the rising transition due to mutual inductance between the two channels CH1 and CH2.

Therefore, an amount of time may pass before the voltage of the sacrificial channel CH2 again rises, and a delay caused by this becomes crosstalk-induced jitter in the even mode.

Referring to FIG. 7, there is illustrated an even mode in which a falling transition occurs in both the victim channel CH2 and the aggressor channel CH1.

When a falling transition occurs in the aggressor channel CH1, a voltage rise occurs in the victim channel CH2 in the upper direction, which is the opposite direction of the falling transition, due to mutual inductance between the two channels CH1 and CH2.

Therefore, an amount of time may pass before the voltage of the sacrificial channel CH2 again falls, and a delay caused by this becomes crosstalk-induced jitter in the even mode.

Consequently, in the even mode, crosstalk-induced jitter, in which a reception signal of the victim channel CH2 is delayed regardless of the transition direction, occurs.

In the odd mode, crosstalk-induced jitter in the opposite direction of the even mode may occur, and its description will be omitted. In the static mode, crosstalk-induced jitter may not occur.

Figure 8:
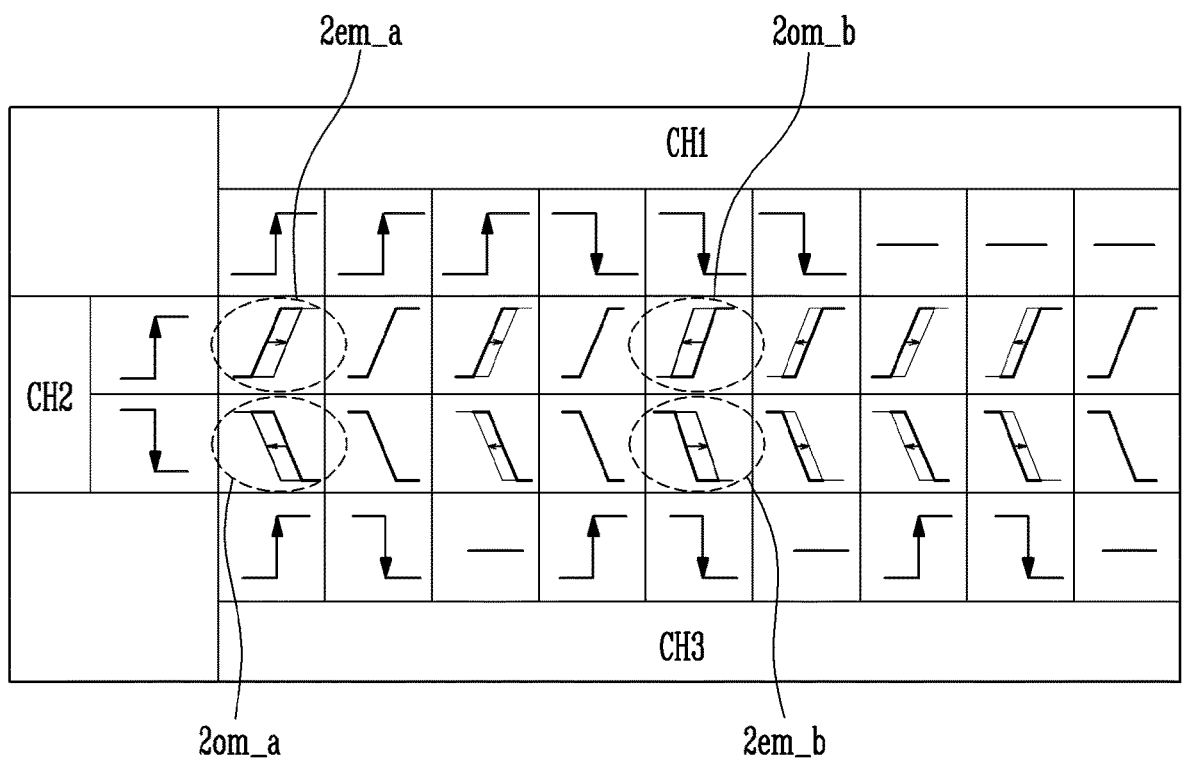
FIG. 8 is a diagram illustrating crosstalk-induced jitter according to a relationship between adjacent reception signals of two adjacent channels and a reception signal of a target channel.

FIG. 8 is a diagram illustrating crosstalk-induced jitter according to a relationship between adjacent reception signals of two adjacent channels and a reception signal of a target channel.

In this description, the victim channel as the target channel is assumed as a channel CH2, and aggressor channels are assumed as channels CH1 and CH3.

Meanwhile, crosstalk-induced jitter that is induced in the channel CH2 may have bad influence on the channels CH1 and CH3, and the bad influence may return to the channel CH2. The influence is relatively insignificant, however, and description is excessively complicated. Therefore, its description will be omitted.

Figure 9:
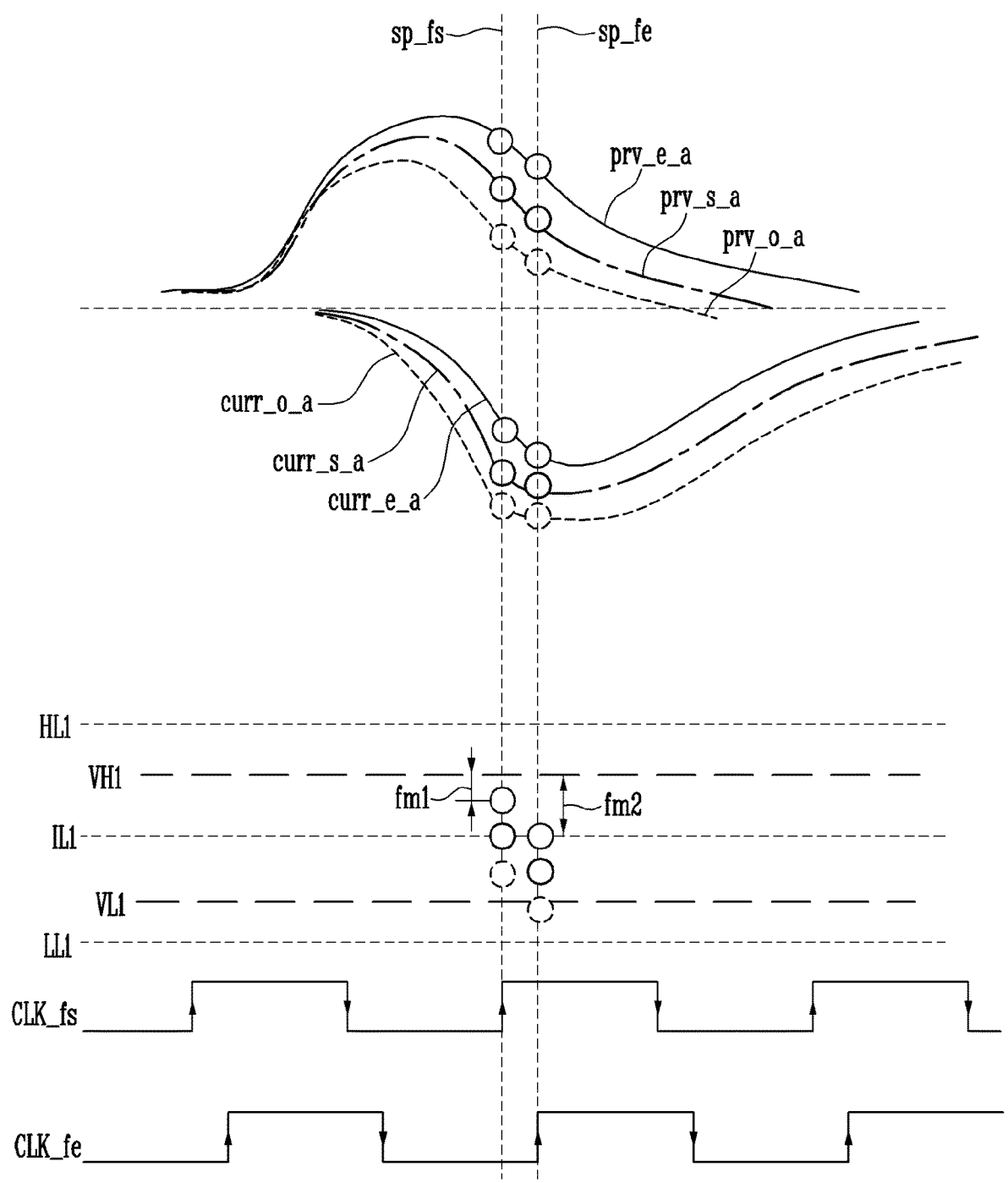
FIG. 9 is a diagram illustrating a reason why first training pattern signals having the same first transition direction are received through channels in a training mode.

A case where transition directions of the victim channel CH2 and the two adjacent aggressor channels CH1 and CH3 are equal to each other is referred to as a 2-even mode. As shown in FIG. 9, there may be two cases (i.e., a case (2em_a) where all signals of the channels CH1, CH2, and CH3 have a rising transition, and a case (2em_b) where all the signals of the channels CH1, CH2, and CH3 have a falling transition).

Referring to FIG. 8, when a transition occurs in the two aggressor channels CH1 and CH3 in the same direction, a relatively largest degree of crosstalk-induced jitter occurs. When a transition occurs in only one aggressor channel, small crosstalk-induced jitter occurs. When transitions occur in the two aggressor channels CH1 and CH3 in directions opposite to each other, the transitions effectively cancelled each other, and therefore no crosstalk-induced jitter occurs.

A case where the two adjacent aggressor channels CH1 and CH3 have the same transition direction that is opposite to that of the victim channel CH2 is referred to as a 2-odd mode. Referring to FIG. 8, two cases (2om_a and 2om_b) are illustrated. In the 2-odd mode, the direction of the crosstalk-induced jitter is opposite to that in the 2-even mode.

A case where no transition occurs in the two adjacent aggressor channel becomes a static mode.

FIG. 9 is a diagram illustrating a reason why first training pattern signals having the same first transition direction are received through channels in the training mode.

Hereinafter, the first transition direction may mean a falling transition direction. The second transition direction may mean a rising transition direction.

In order to describe this, referring back to FIGS. 2 and 3, the following features of duo-binary signaling can be seen. In both the case of a rising transition, in which the binary level is subjected to a transition from 0 to 1, and the case of a falling transition, in which the binary level is subjected to a transition from 1 to 0, the level of a sampled reception signal becomes the intermediate level IL1.

For example, referring to the transmission signal of FIG. 2, the binary level is subjected to the rising transition from 0 to 1 and is immediately subjected to the falling transition from 1 to 0. Referring to the reception signal fr_a of FIG. 2, both the levels of the reception signal sampled at the sampling times sp2_a and sp3_a corresponding to the respective transitions are at the intermediate level IL1.

Also, for example, referring to the transmission signal of FIG. 3, the binary level is subjected to the rising transition from 0 to 1, is maintained 1 for a unit interval UI, and then is subjected to the falling transition from 1 to 0. Referring to the reception signal spr_b of FIG. 3, both the levels of reception signal sampled at the sampling times sp2_b and sp4_b corresponding to the respective transitions are at the intermediate level IL1.

In the present embodiment, compensation for crosstalk-induced jitter may be performed based on the features of the duo-binary signaling.

Referring back to FIG. 9, there is conceptually illustrated a case where a 1UI previous signal (e.g., an immediately preceding signal occurring one unit interval UI previously) has the binary level 1, and a current signal has the binary level 0. That is, the case of the falling transition is illustrated. Signals shown in FIG. 9 are not actual signals. Each different response to each binary data is conceptually separated for easy understanding, and the separated responses are exaggerated and illustrated. For example, a sampling time (e.g., sampling moment) sp_fs of FIG. 9 may correspond to the sampling time sp3_a of FIG. 2, and a signal obtained by overlapping a previous signal prv_s_a and a current signal curr_s_a of FIG. 9 with each other may be the reception signal fr_a at the sampling time sp3_a of FIG. 2.

Previous signals prv_o_a, prv_s_a, and prv_e_a of FIG. 9 are respectively single bit responses with respect to the binary level 1 in the odd mode, the static mode, and the even mode. A case where the level of pre-/post-binary data is 0 is assumed so as to clearly illustrate a signal.

Current signals curr_o_a, curr_s_a, and curr_e_a of FIG. 9 are respectively single bit responses with respect to the binary level 0 in the odd mode, the static mode, and the even mode. A case where the level of pre-/post-binary data is 1 is assumed so as to clearly illustrate a signal.

The sampling time sp_fs is a sampling time of a sampling clock signal CLK_fs of which phase is adjusted based on the static mode, and a sampling time sp_fe is a sampling time of a sampling clock signal CLK_fe of which phase is adjusted based on the even mode.

When reception signals are in the static mode and are sampled at the sampling time sp_fs, using the sampling clock signal CLK_fs, a sum of a first post cursor of the 1UI previous signal prv_s_a and a main cursor of the current signal curr_s_a becomes the intermediate level IL1. Because the binary level of the previous signal prv_s_a is 1, the first reference voltage VH1 is used to determine the current signal curr_s_a. Because the sum of the first post cursor of the 1UI previous signal prv_s_a and the main cursor of the current signal curr_s_a is the intermediate level IL1, which is lower than the first reference voltage VH1, the binary level of the current signal curr_s_a may be determined as 0.

On the other hand, when reception signals are in the even mode and are sampled at the sampling time sp_fs, using the sampling clock signal CLK_fs, the sum of a first post cursor of the 1UI previous signal prv_e_a and a main cursor of the current signal curr_e_a is higher than the intermediate level IL1. Because the binary level of the previous signal prv_e_a is 1, the first reference voltage VH1 is used to determine the current signal curr_e_a. Because the sum of the first post cursor of the 1UI previous signal prv_e_a and the main cursor of the current signal curr_e_a is lower than the first reference voltage VH1, the binary level of the current signal curr_e_a is to be determined as 0, but there is a problem in that a margin fm1 is too small. When the sum of the first post cursor of the 1UI previous signal prv_e_a and the main cursor of the current signal curr_e_a exceeds the first reference voltage VH1 according to a communication environment, an error occurs in decoding.

When reception signals are in the odd mode and are sampled at the sampling time sp_fs, using the sampling clock signal CLK_fs, the sum of a first post cursor of the 1UI previous signal prv_o_a and a main cursor of the current signal curr_o_a is lower than the intermediate level IL1. Because the binary level of the previous signal prv_o_a is 1, the first reference voltage VH1 is used to determine the current signal curr_o_a. Because the sum of the first post cursor of the 1UI previous signal prv_o_a and the main cursor of the current signal curr_o_a is sufficiently lower than the first reference voltage VH1, there is no problem in that the binary level of the current signal curr_o_a is determined as 0. In the odd mode, a margin exists which is larger than the margin in the static mode and in the even mode.

As described above, in case of the falling transition, the worst case where compensation is to be performed is the case of the even mode (e.g., where the margin fm1 is smallest).

According to the present embodiment, "first training pattern signals having the same first transition direction" (e.g., "first training pattern signals having the falling transition direction of the even mode") may be received through the channels CH1 to CH(2n−1) in the training mode.

According to the present embodiment, the sampling clock signal CLK_fe, of which phase is adjusted (e.g., delayed) such that a transition time of the first training pattern signal corresponds to the sampling time sp_fe, may be generated. It can be seen that a sufficient margin fm2 exists in the case of the even mode at the sampling time sp_fe at which the phase of the sampling clock signal CLK_fe is adjusted. Because margins larger than that of the even mode exist in the case of the static mode and the odd mode, there is no problem. Thus, when the sampling clock signal CLK_fe is used, the probability that a decoding error will occur due to the crosstalk-induced jitter in all of the modes is decreased.

Figure 10:
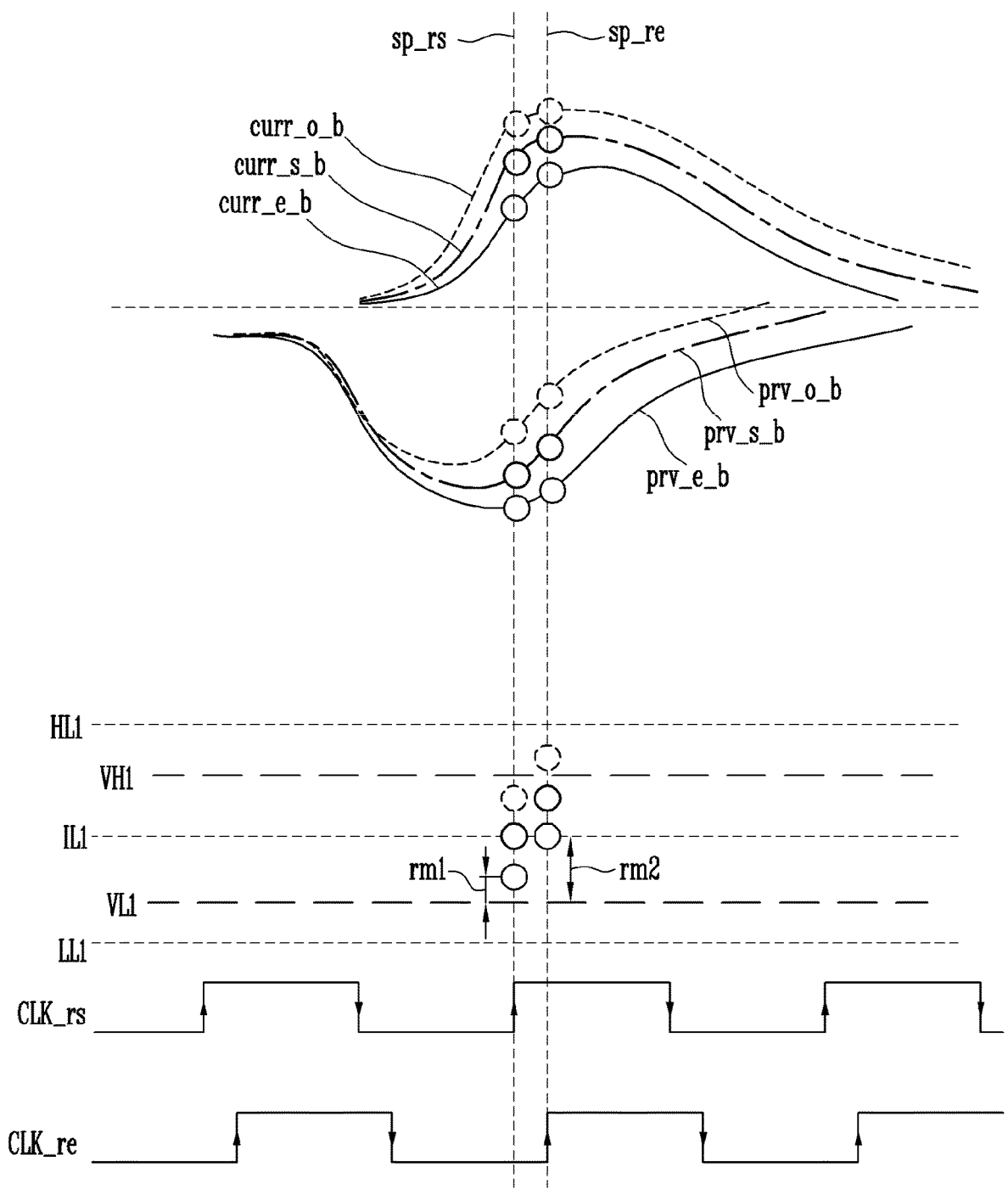
FIG. 10 is a diagram illustrating a reason why second training pattern signals having the same second transition direction are received through the channels in the training mode.

FIG. 10 is a diagram illustrating a reason why second training pattern signals having the same second transition direction are received through the channels in the training mode.

Referring to FIG. 10, there is conceptually illustrated a case where a 1UI previous signal has the binary level 0 and a current signal has the binary level 1. That is, the case of the rising transition is illustrated. Signals shown in FIG. 10 are not actual signals, and a response to each binary data is conceptually separated for easy understanding, and the separated responses are exaggerated and illustrated. For example, a sampling time sp_4s of FIG. 10 may correspond to the sampling time sp2_a of FIG. 2, and a signal obtained by overlapping a previous signal prvs_b and a current signal curr_s_b of FIG. 10 with each other may be the reception signal fr_a at the sampling time sp2_a of FIG. 2.

Previous signals prv_o_b, prv_s_b, and prv_e_b of FIG. 10 are respectively single bit responses with respect to the binary level 0 in the odd mode, the static mode, and the even mode. A case where the level of pre-/post-binary data is 1 is assumed so as to clearly illustrate a signal.

Current signals curr_o_b, curr_s_b, and curr_e_b of FIG. 10 are respectively single bit responses with respect to the binary level 1 in the odd mode, the static mode, and the even mode. A case where the level of pre-/post-binary data is 0 is assumed so as to clearly illustrate a signal.

The sampling time sp_rs is a sampling time of a sampling clock signal CLK_rs of which phase is adjusted based on the static mode, and a sampling time sp_re is a sampling time of a sampling clock signal CLK_re of which phase is adjusted based on the even mode.

When reception signals are in the static mode and are sampled at the sampling time sp_rs, using the sampling clock signal CLK_rs, the sum of a first post cursor of the 1UI previous signal prv_s_b and a main cursor of the current signal curr_s_b is equal to the intermediate level IL1. Because the binary level of the previous signal prvs_b is 0, the second reference voltage VL1 is used to determine the current signal curr_s_b. Because the sum of the first post cursor of the 1UI previous signal prv_s_b and the main cursor of the current signal curr_s_b is at the intermediate level IL1, which is higher than the second reference voltage VL1, the binary level of the current signal curr_s_b may be determined as 1.

On the other hand, when reception signals are in the even mode and are sampled at the sampling time sp_rs, using the sampling clock signal CLK_rs, the sum of a first post cursor of the 1UI previous signal prv_e_b and a main cursor of the current signal curr_e_b is lower than the intermediate level IL1. Because the binary level of the previous signal prv_e_b is 0, the second reference voltage VL1 is used to determine the current signal curr_e_b. Because the sum of the first post cursor of the 1UI previous signal prv_e_b and the main cursor of the current signal curr_e_b is higher than the second reference voltage VL1, the binary level of the current signal curr_e_b is to be determined as 1. However, there is a problem in that a margin rm1 is too small. When the sum of the first post cursor of the 1UI previous signal prv_e_b and the main cursor of the current signal curr_e_b is less than the second reference voltage VL1 according to a communication environment, an error occurs in decoding.

When reception signals are in the odd mode and are sampled at the sampling time sp_rs, using the sampling clock signal CLK_rs, the sum of a first post cursor of the 1UI previous signal prv_o_b and a main cursor of the current signal curr_o_b is higher than the intermediate level IL1. Because the binary level of the previous signal prv_o_b is 0, the second reference voltage VL1 is used to determine the current signal curr_o_b. Because the sum of the first post cursor of the 1UI previous signal prv_o_b and the main cursor of the current signal curr_o_b is sufficiently higher than the second reference voltage VL1, there is no problem in that the binary level of the current signal curr_o_b is determined as 1. In the odd mode, a margin exists that is larger than that in the static mode (and that is also larger than the margin rm1 in the even mode).

As described above, in the case of the rising transition, the worst case where compensation is to be performed is the case of the even mode.

According to the present embodiment, "second training pattern signals having the same second transition direction" (e.g., "second training pattern signals having the rising transition direction of the even mode") may be received through the channels CH1 to CH(2n−1) in the training mode.

According to the present embodiment, the sampling clock signal CLK_re, of which phase is adjusted such that a transition time of the second training pattern signal corresponds to the sampling time sp_re, may be generated. It can be seen that a sufficient margin rm2 exists in the case of the even mode at the sampling time sp_re at which the phase of the sampling clock signal CLK_re is adjusted. Because margins larger than that of the even mode exist in the case of the static mode and the odd mode, there is no problem. Thus, when the sampling clock signal CLK_re is used, the probability that a decoding error will occur due to the crosstalk-induced jitter is decreased for all of the modes.

In both the case of the falling transition of FIG. 9 and the case of the rising transition of FIG. 10, the phases of the sampling clock signals CLK_fe and CLK_re, which are set based on the even mode, are delayed when compared with those of the sampling clock signals CLK_fs and CLK_rs set based on the static mode.

Therefore, according to an embodiment of the present disclosure, training may be performed on only any one of the first training pattern signal and the second training pattern signal in the training mode, so that the margins fm2 and rm2 can be secured.

According to another embodiment of the present disclosure, training may be performed on both the first training pattern signal and the second training pattern signal in the training mode. The clock data recovery unit CDR may generate a sampling clock signal to correspond to a further delayed phase between a first sampling time sp_fe corresponding to the first transition time of the first training pattern signal, and a second sampling time sp_re corresponding to the second transition time of the second training pattern signal. In the case of a transition corresponding to a faster phase, a margin is further secured from a reference voltage, and thus the problem of decoding error can be solved.

Although a case where sampling according to the rising transition of the sampling clock signal is performed is described in FIGS. 9 and 10, sampling according to the falling transition of the sampling clock signal may be performed depending on products. In addition, when sampling using a current integral method is applied depending on products, the transition times of the clock signals CLK_fs, CLK_rs, and CLK_re may precede those of the sampling times sp_fs, sp_fe, sp_rs, and sp_re so as to secure acquisition time. Hereinafter, for convenience of description, a case where sampling is performed at the rising transition of the sampling clock signal will be described.

Figure 11:
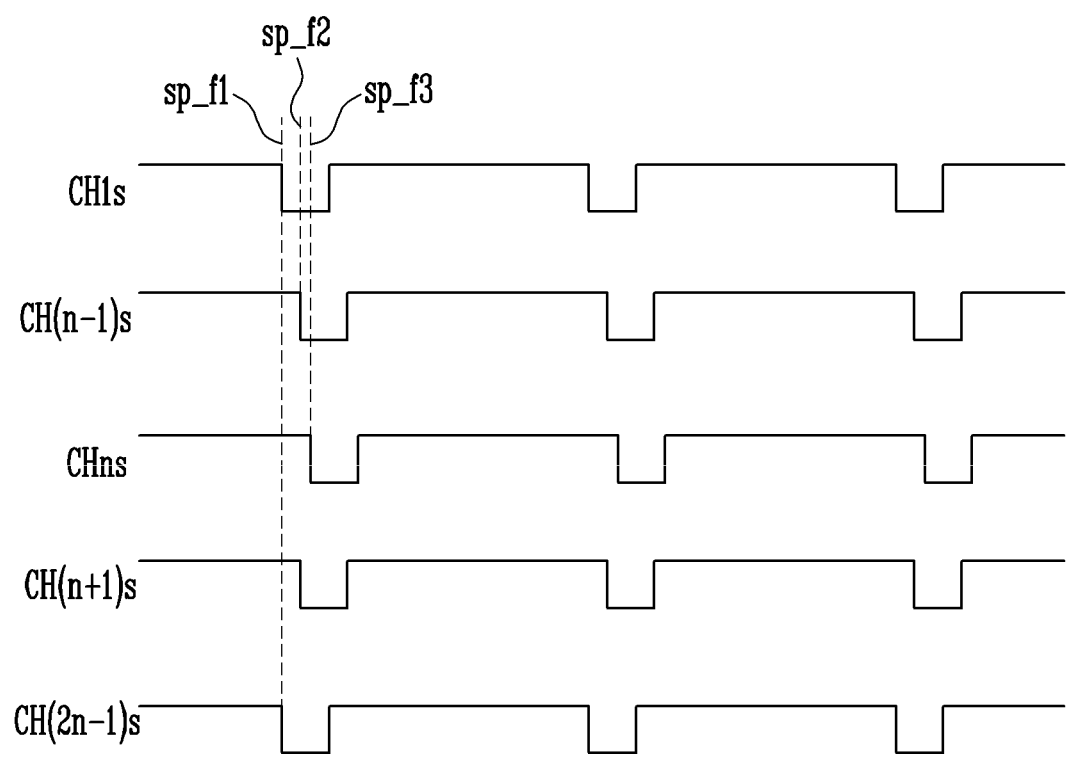
FIGS. 11 and 12 are diagrams illustrating a reason why a clock signal is recovered using a first training pattern signal of a sensing channel among the first training pattern signals of the channels.
Figure 12:
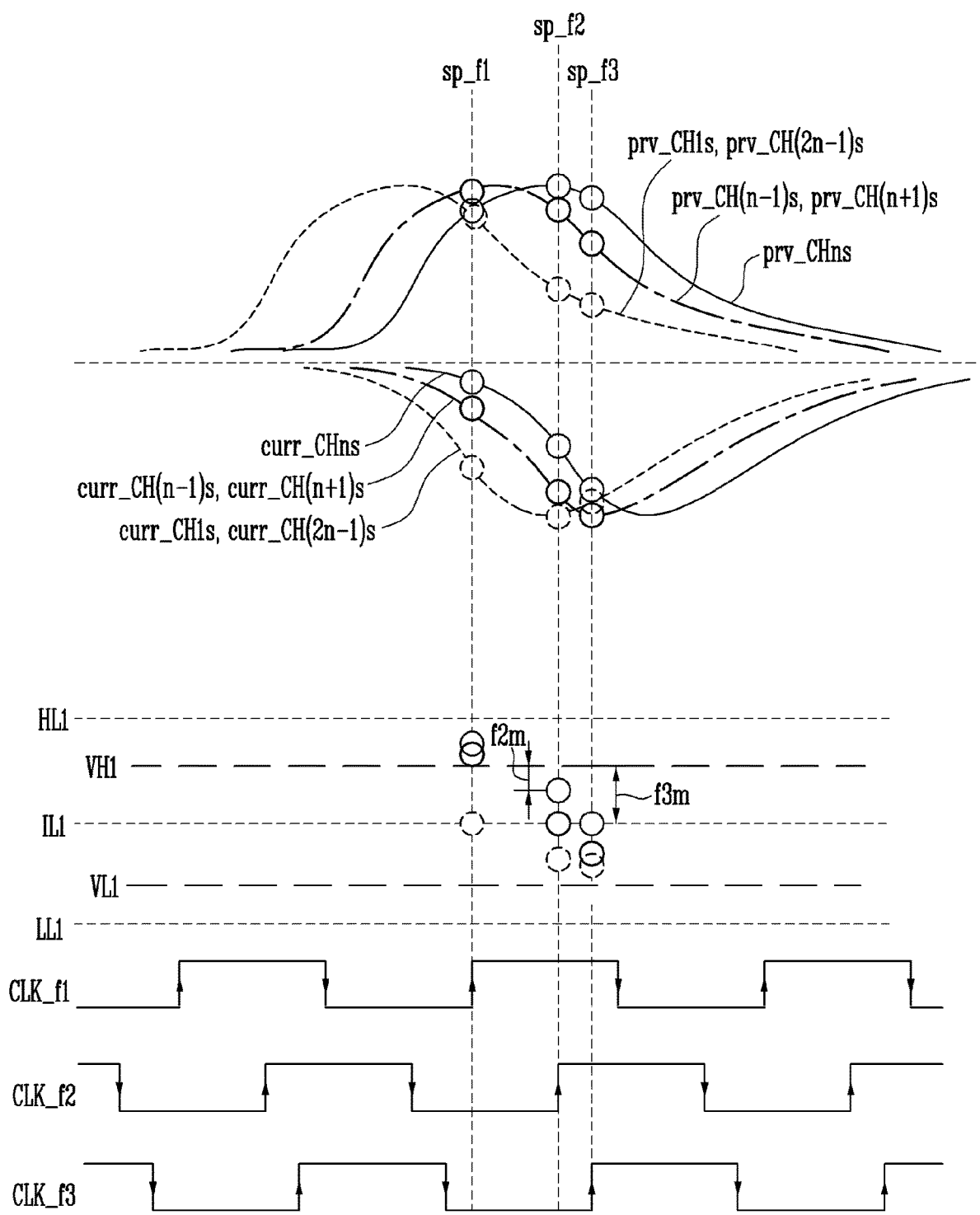

FIGS. 11 and 12 are diagrams illustrating a reason why a clock signal is recovered using a first training pattern signal of a sensing channel among the first training pattern signals of the channels.

Hereinafter, a case where training pattern signals are provided in the even mode is assumed.

Although the transmitting units TX1 to TX(2n−1) transmit the same first training pattern signals, crosstalk-induced jitter has most influence on the sensing channel CHn located in the middle, and therefore, the phase of a first training pattern signal CHns may be delayed to the greatest degree. A sampling clock signal CLK_f3 may be a signal of which phase is adjusted such that a transition time of the first training pattern signal CHns corresponds to a sampling time sp_f3.

The phases of first training pattern signals CH(n−1)s and CH(n+1)s respectively received through the channels CH(n−1) and CH(n+1) are delayed as compared with other first training pattern signals, but may occur sooner than that of the first training pattern signal CHns. A sampling clock signal CLK_f2 may be a signal of which phase is adjusted such that transition times of the first training pattern signals CH(n−1)s and CH(n+1)s correspond to a sampling time sp_f2.

In the present example, crosstalk-induced jitter has least influence on the channels CH1 and CH(2n−1) that are located at the outermost sides, and therefore, the phases of first training pattern signals CH1s and CH(2n−1)s may occur sooner than those of other first training pattern signals. A sampling clock CLK_f1 may be a signal of which phase is adjusted such that transition times of the first training pattern signals CH1s and CH(2n−1)s correspond to a sampling time sp_f1.

When reception signals are sampled at the sampling time sp_f1, using the sampling clock signal CLK_f1, each of the sums of first post cursors of previous signals prv_CH1s and prv_CH(2n−1)s of the channels CH1 and CH(2n−1) and main cursors of current signals curr_CH1s and curr_CH(2n−1)s of the channels CH1 and CH(2n−1) becomes the intermediate level IL1, and a margin from the first reference voltage VH1 is sufficient. Thus, there is no problem in that the reception signals are decoded to have the binary level 0.

However, each of the sum of first post cursors of previous signals prv_CH(n−1)s and prv_CH(n+1)s of the channels CH(n−1) and CH(n+1) and main cursors of current signals curr_CH(n−1)s and curr_CH(n+1)s of the channels CH(n−1) and CH(n+1), and the sum of a first post cursor of a previous signal prv_CHns of the channel CHn and a main cursor of a current signal curr_CHns of the channel CHn, exceeds the first reference voltage VH1, and therefore, an error occurs because the reception signals are erroneously decoded to have the binary level 1.

When reception signals are sampled at the sampling time sp_f2, using the sampling clock signal CLK_f2, each of the sums of the first post cursors of the previous signals prv_CH (n−1)s and prv_CH(n+1)s of the channels CH(n−1) and CH(n+1) and the main cursors of the current signals curr_CH(n−1)s and curr_CH(n+1)s of the channels CH(n−1) and CH(n+1) becomes the intermediate level IL1, and a margin from the first reference voltage VH1 is sufficient. Thus, there is no problem as the reception signals are decoded to have the binary level 0.

In addition, each of the sums of the first post cursors of the previous signals prv_CH1s and prv_CH(2n-1)s of the channels CH1 and CH(2n−1) and the main cursors of the current signals curr_CH1s and curr_CH(2n-1)s of the channels CH1 and CH(2n-1) becomes the intermediate level IL1 or less, and a margin from the first reference voltage VH1 is sufficient. Thus, there is no problem as the reception signals are decoded to have the binary level 0.

However, the sum of the first post cursor of the previous signal prv_CHns of the channel CHn and the main cursor of the current signal curr_CHns of the channel CHn has an insufficient margin f2m from the first reference voltage VH1, and therefore, it is possible that the reception signals will be erroneously decoded to have the binary level 1.

When reception signals are sampled at the sampling time sp_f3, using the sampling clock signal CLK_f3, the sum of the first post cursor of the previous signal prv_CHns of the channel CHn and the main cursor of the current signal curr_CHns of the channel CHn becomes the intermediate level IL1, and a margin f3m from the first reference voltage VH1 is sufficient. Thus, there is no problem in that the reception signals are decoded to have the binary level 0. Other channels CH1, CH(n−1), CH(n+1), and CH(2n−1) have a large margin from the first reference voltage VH1, as compared with the channel CHn, and thus there is no problem as the reception signals are decoded to have the binary level 0.

Accordingly, it can be seen that, although the sampling clock signal CLK_f3 is generated using the first training pattern signal of the sensing channel CHn on which the crosstalk-induced jitter has most influence, there is no problem in that data signals of the other channels CH1, CH(n−1), CH(n+1), and CH(2n−1) are accurately sampled.

Figure 13:
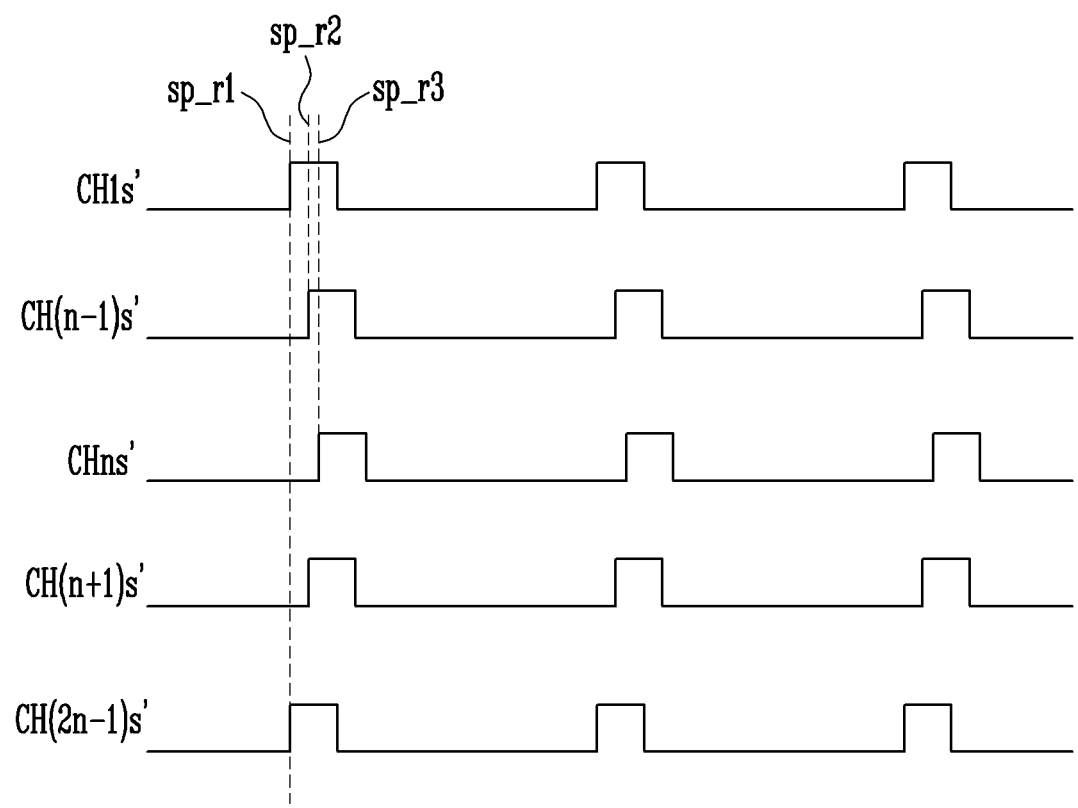
FIGS. 13 and 14 are diagrams illustrating a reason why a clock signal is recovered using a second training pattern signal of the sensing channel among the second training pattern signals of the channels.
Figure 14:
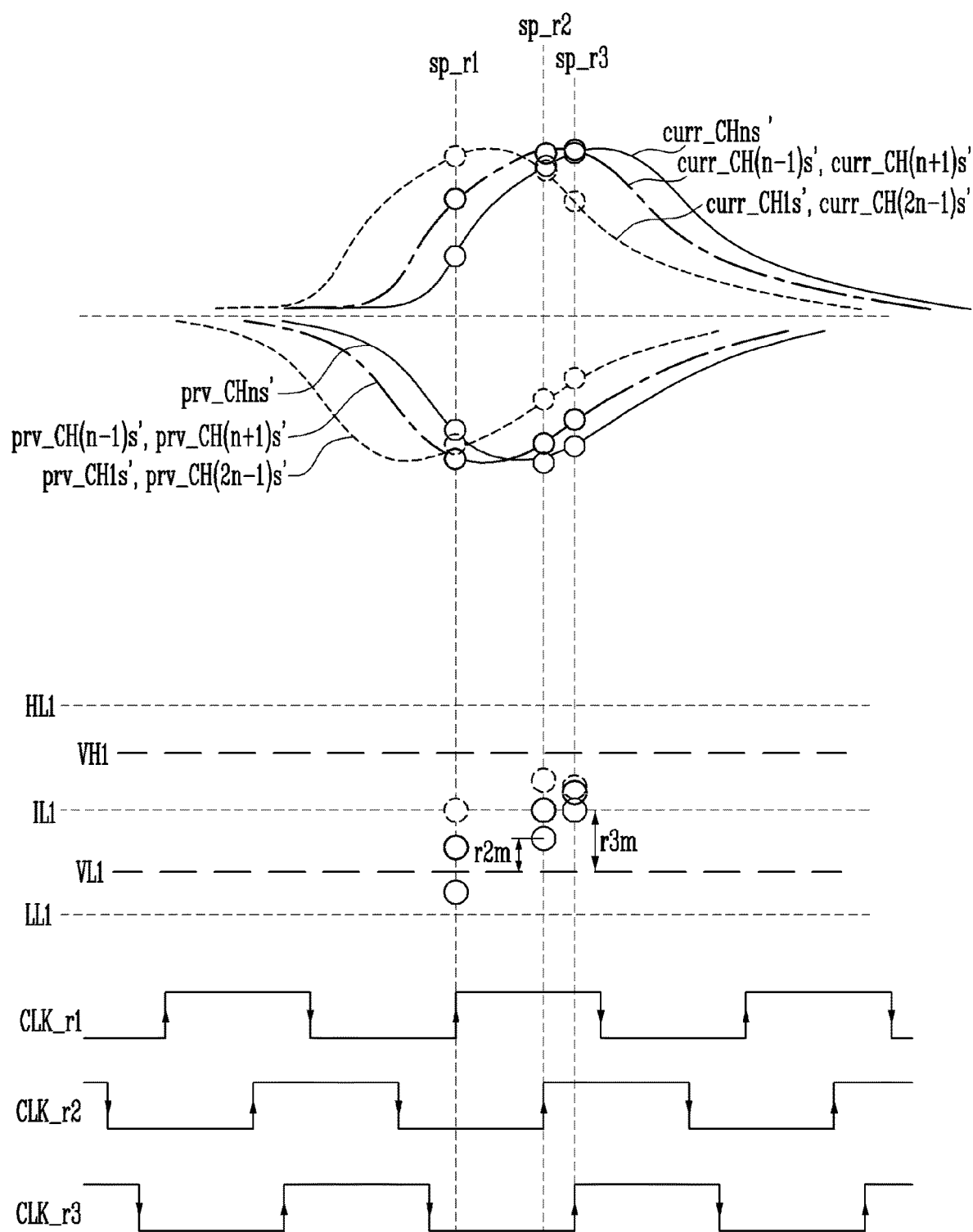

FIGS. 13 and 14 are diagrams illustrating a reason why a clock signal is recovered using a second training pattern signal of the sensing channel among the second training pattern signals of the channels.

Hereinafter, a case where training pattern signals are provided in the even mode is assumed.

Although the transmitting units TX1 to TX(2n−1) transmit the same second training pattern signals, crosstalk-induced jitter has most influence on the sensing channel CHn located in the middle, and therefore, the phase of a second training pattern signal CHns' may be most delayed. A sampling clock signal CLK_r3 may be a signal of which a phase thereof is adjusted such that a transition time of the second training pattern signal CHns' corresponds to a sampling time sp_r3.

The phases of second training pattern signals CH(n−1)s' and CH(n+1)s' received through the channels CH(n−1) and CH(n+1) are delayed as compared with other second training pattern signals, but may occur sooner than that of the second training pattern signal CHns'. A sampling clock signal CLK_r2 may be a signal of which phase is adjusted such that transition times of the second training pattern signals CH(n−1)s' and CH(n+1)s' correspond to a sampling time sp_r2.

Crosstalk-induced jitter has least influence on the channels CH1 and CH(2n-1) located at the outermost sides, and therefore, the phases of second training pattern signals CH1s' and CH(2n−1)s' may be faster than, or may be less delayed than, or may occur sooner than, those of other second training pattern signals. A sampling clock CLK_r1 may be a signal of which phase is adjusted such that transition times of the second training pattern signals CH1s' and CH(2n−1)s' correspond to a sampling time sp_r1.

When reception signals are sampled at the sampling time sp_r1, using the sampling clock signal CLK_r1, each of the sums of first post cursors of previous signals prv_CH1s' and prv_CH(2n−1)s' of the channels CH1 and CH(2n−1) and main cursors of current signals curr_CH1s' and curr_CH (2n−1)s' of the channels CH1 and CH(2n−1) becomes the intermediate level IL1, and a margin from the second reference voltage VL1 is sufficient. Thus, there is no problem as the reception signals are decoded to have the binary level 1.

However, each of the sum of first post cursors of previous signals prv_CH(n−1)s' and prv_CH(n+1)s' of the channels CH(n−1) and CH(n+1) and main cursors of current signals curr_CH(n−1)s' and curr_CH(n+1)s' of the channels CH(n−1) and CH(n+1) has an insufficient margin from the second reference voltage VL1, and therefore, the reception signals may be erroneously decoded to have the binary level 0. In addition, the sum of a first post cursor of a previous signal prv_CHns' of the channel CHn and a main cursor of a current signal curr_CHns' of the channel CHn is less than the second reference voltage VL1, and therefore, an error occurs because the reception signals are erroneously decoded to have the binary level 0.

When reception signals are sampled at the sampling time sp_r2, using the sampling clock signal CLK_r2, each of the sums of the first post cursors of the previous signals prv_CH (n−1)s' and prv_CH(n+1)s' of the channels CH(n−1) and CH(n+1) and the main cursors of the current signals curr_CH(n−1)s' and curr_CH(n+1)s' of the channels CH(n−1) and CH(n+1) becomes the intermediate level IL1, and a margin from the second reference voltage VL1 is sufficient. Thus, there is no problem as the reception signals are decoded to have the binary level 1.

In addition, each of the sums of the first post cursors of the previous signals prv_CH1s' and prv_CH(2n−1)s' of the channels CH1 and CH(2n−1) and the main cursors of the current signals curr_CH1s' and curr_CH(2n−1)s' of the channels CH1 and CH(2n−1) becomes the intermediate level IL1 or more, and a margin from the second reference voltage VL1 is more sufficient. Thus, there is no problem as the reception signals are decoded to have the binary level 1.

However, the sum of the first post cursor of the previous signal prv_CHns' of the channel CHn and the main cursor of the current signal curr_CHns' of the channel CHn has an insufficient margin r2m from the second reference voltage VL1, and therefore, it is likely that the reception signals will be erroneously decoded to have the binary level 0.

When reception signals are sampled at the sampling time sp_r3, using the sampling clock signal CLK_r3, the sum of the first post cursor of the previous signal prv_CHns' of the channel CHn and the main cursor of the current signal curr_CHns' of the channel CHn becomes the intermediate level IL1, and a margin r3m from the second reference voltage VL1 is sufficient. Thus, there is no problem as the reception signals are decoded to have the binary level 1. Other channels CH1, CH(n−1), CH(n+1), and CH(2n−1) have a large margin from the second reference voltage VL1, as compared with the channel CHn, and thus there is no problem as the reception signals are decoded to have the binary level 1.

Accordingly, it can be seen that, although the sampling clock signal CLK_r3 is generated using the second training pattern signal of the sensing channel CHn on which the crosstalk-induced jitter has most influence, there is no problem as the data signals of the other channels CH1, CH(n−1), CH(n+1), and CH(2n−1) are accurately sampled.

Figure 15:
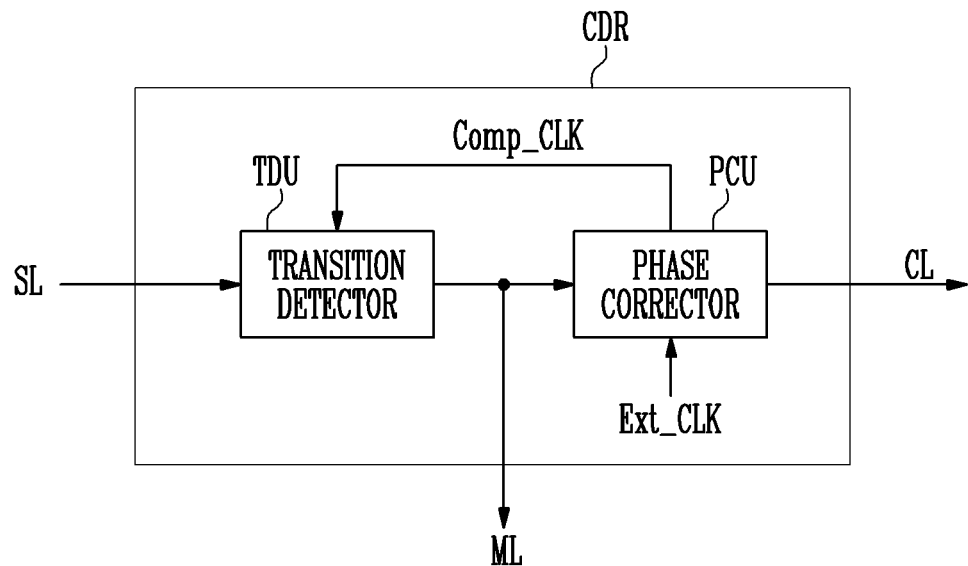
FIG. 15 is a diagram illustrating a clock data recovery unit according to an embodiment of the present disclosure.

FIG. 15 is a diagram illustrating a clock data recovery unit according to an embodiment of the present disclosure.

Referring to FIG. 15, the clock data recovery unit CDR may include a transition detector TDU and a phase corrector PCU.

The transition detector TDU may provide a mode signal corresponding to the training mode or the normal mode based on a training pattern signal and a compensation clock signal Comp_CLK. The training pattern signal may be a first training pattern signal or a second training pattern signal, and may be received through the sensing line SL.

The phase corrector PCU may generate at least one of the compensation clock signal Comp_CLK and a sampling clock signal based on the mode signal and an external clock signal Ext_CLK. The compensation clock signal Comp_CLK may be provided to the transition detector TDU, and the sampling clock signal may be provided to the clock line CL.

First, when a training pattern signal is input, the transition detector TDU may provide a mode signal corresponding to the training mode. When the mode signal corresponding to the training mode is input, the phase corrector PCU may generate the compensation clock signal Comp_CLK by correcting/adjusting the phase of the external clock signal Ext_CLK.

Next, when the detection of a transition time of the training pattern signal succeeds based on the compensation clock signal Comp_CLK in the training mode, the transition detector TDU may provide a mode signal corresponding to the normal mode. On the other hand, when the detection of the transition time of the training pattern signal fails based on the compensation clock signal Comp_CLK in the training mode, the transition detector TDU may continuously provide the mode signal corresponding to the training mode.

When the training mode is maintained, the phase corrector PCU may re-generate the compensation clock signal Comp_CLK by re-correcting the phase of the external clock signal Ext_CLK. Also, when the training mode is ended and the normal mode is started, the phase corrector PCU may generate a sampling clock signal having the same phase as a current compensation clock signal Comp_CLK.

Figure 16:
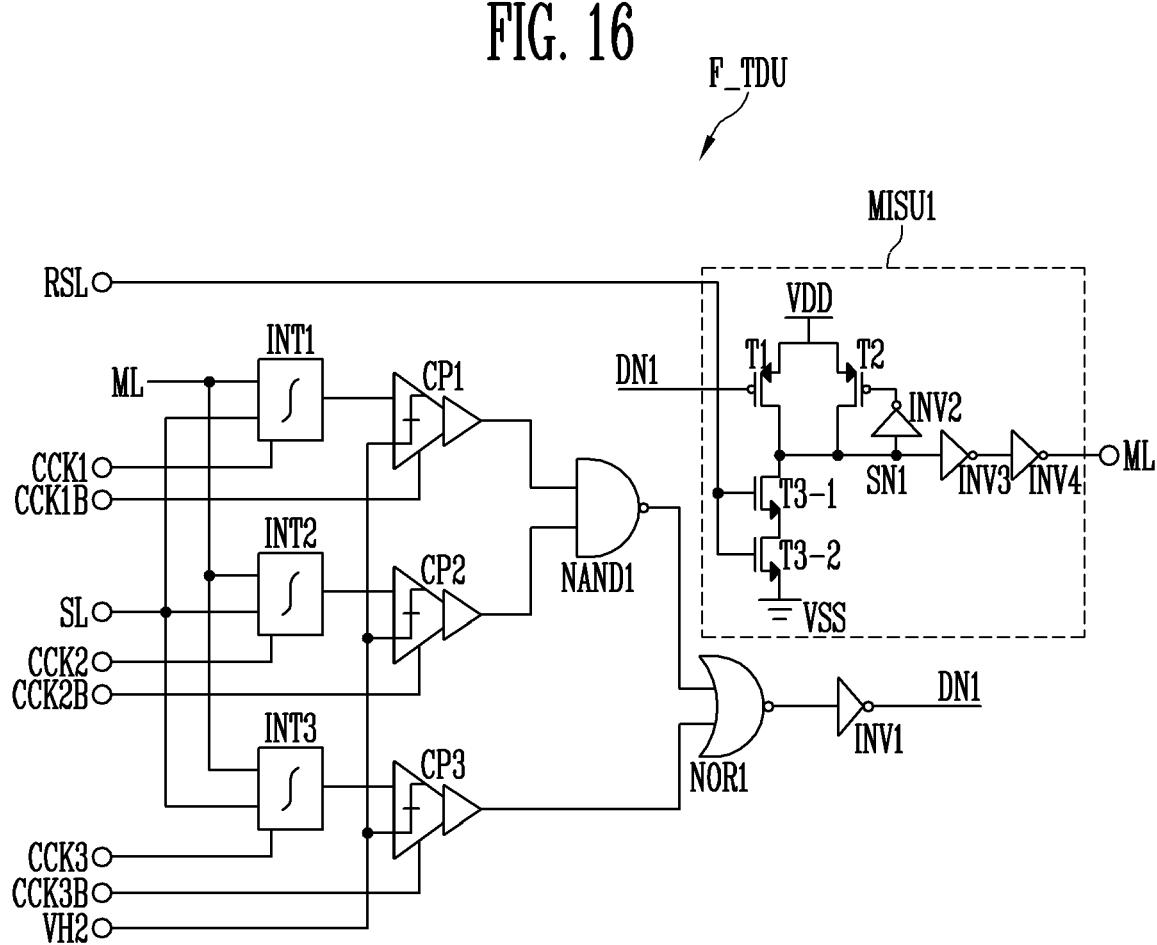
FIG. 16 is a diagram illustrating a transition detector according to an embodiment of the present disclosure.

FIG. 16 is a diagram illustrating a transition detector according to an embodiment of the present disclosure.

Referring to FIG. 16, the transition detector F_TDU according to the embodiment of the present disclosure may include integrators INT1, INT2, and INT3, comparators CP1, CP2, and CP3, a first NAND gate NAND1, a first NOR gate NOR1, a first inverter INV1, and a first mode signal maintainer MISU1.

The transition detector F_TDU may receive first to third compensation clock signals CCK1, CCK2, and CCK3 as the above-described compensation clock signal Comp_CLK. The second compensation clock signal CCK2 may have a phase that is further delayed than that of the first compensation clock signal CCK1, and the third compensation clock signal CCK3 may have a phase that is further delayed than that of the second compensation clock signal CCK2. A phase difference between the second compensation clock signal CCK2 and the first compensation clock signal CCK1 may be equal to that between the third compensation clock signal CCK3 and the second compensation clock signal CCK2.

Also, the transition detector F_TDU may receive a first training pattern signal through the sensing line SL.

A first integrator INT1 may provide a first integral signal by integrating the first training pattern signal according to the first compensation clock signal CCK1. For example, the first integrator INT1 may provide the first integral signal by integrating the first training pattern signal during a period in which the first compensation clock signal CCK1 has a high level.

A second integrator INT2 may provide a second integral signal by integrating the first training pattern signal according to the second compensation clock signal CCK2. For example, the second integrator INT2 may provide the second integral signal by integrating the first training pattern signal during a period in which the second compensation clock signal CCK2 has the high level.

A third integrator INT3 may provide a third integral signal by integrating the first training pattern signal according to the third compensation clock signal CCK3. For example, the third integrator INT3 may provide the third integral signal by integrating the first training pattern signal during a period in which the third compensation clock signal CCK3 has the high level.

In some embodiments, the integrators INT1, INT2, and INT3 may receive a first mode signal through the mode line ML. The integrators INT1, INT2, and INT3 may operate with the first mode signal of the training mode, during which the operation of the integrators INT1, INT2, and INT3 with the first mode signal of the normal mode may be stopped.

A first comparator CP1 may output a logic value of 1 when the first integral signal is larger than a first reference voltage VH2, and may output a logic value of 0 when the first integral signal is smaller than the first reference voltage VH2. For example, the first comparator CP1 may operate when an inverting signal CCK1B of the first compensation clock signal CCK1 has the high level to compare the first integral signal and the first reference voltage VH2.

A second comparator CP2 may output the logic value 1 when the second integral signal is larger than the first reference voltage VH2, and may output the logic value 0 when the second integral signal is smaller than the first reference voltage VH2. For example, the second comparator CP2 may operate when an inverting signal CCK2B of the second compensation clock signal CCK2 has the high level to compare the second integral signal and the first reference voltage VH2.

A third comparator CP3 may output the logic value 1 when the third integral signal is larger than the first reference voltage VH2, and may output the logic value 0 when the third integral signal is smaller than the first reference voltage VH2. For example, the third comparator CP3 may operate when an inverting signal CCK3B of the third compensation clock signal CCK3 has the high level to compare the third integral signal and the first reference voltage VH2.

In some embodiments, each of the first to third comparators CP1, CP2, and CP3 includes a latch at the latter end thereof to maintain an output value thereof during a certain period.

The first NAND gate NAND1 may receive output values of the first comparator CP1 and the second comparator CP2.

The first NOR gate NOR1 may receive output values of the first NAND gate NAND1 and the third comparator CP3.

The first inverter INV1 may output a first detection signal by inverting an output value of the first NOR gate NOR1. The first detection signal may be applied to a first detection node DN1.

The first mode signal maintainer MISU1 may provide the first mode signal of the training mode corresponding to an initialization signal having a turn-on level. The first mode signal maintainer MISU1 may receive the initialization signal through an initialization line RSL, and may provide the first mode signal through the mode line ML.

In some embodiments, the first mode signal maintainer MISU1 may provide the first mode signal of the normal mode corresponding to the first detection signal having a first turn-on level after the initialization signal having the turn-on level is supplied, and then may maintain the first mode signal of the normal mode regardless of a change in level of the first detection signal.

That is, when the first mode signal maintainer MISU1 starts providing the first mode signal of the normal mode, based on the first detection signal, the first mode signal maintainer MISU1 may continuously provide the first mode signal of the normal mode regardless of a subsequent change in level of the first detection signal. In the present embodiment, for the first mode signal maintainer MISU1 to provide the first mode signal of the training mode, it may be useful to receive the initialization signal having the turn-on level through the initialization line RSL.

The "turn-on level" means a level of a signal at which a transistor to which the corresponding signal is applied can be turned on. For example, a first transistor T1 having a gate electrode to which the first detection signal is applied is implemented with a P-type transistor (e.g., a PMOS transistor), and therefore, the turn-on level of the first detection signal may be a low level. In addition, a third transistor T3-1 and T3-2 having a gate electrode to which the initialization signal is applied are implemented with an N-type transistor (e.g., an NMOS transistor), and therefore, the turn-on level of the initialization signal may be the high level.

In some embodiments, the first mode signal maintainer MISU1 may include transistors T1, T2, T3-1, and T3-2 and inverters INV2, INV3, and INV4.

The first detection signal may be applied to the gate electrode of the first transistor T1, one electrode of the first transistor T1 may be connected to a first power source VDD, and the other electrode of the first transistor T1 may be connected to a first sensing node SN1. The first transistor T1 may be implemented with the P-type transistor. The gate electrode of the first transistor T1 may be connected to the first detection node DN1.

A gate electrode of a second transistor T2 may be connected to an output end of a second inverter INV2, one electrode of the second transistor T2 may be connected to the first power source VDD, and the other electrode of the second transistor T2 may be connected to the first sensing node SN1. The second transistor T2 may be implemented as a P-type transistor.

The initialization signal is applied to the gate electrode of the third transistor T3-1 and T3-2, one electrode of the third transistor T3-1 and T3-2 may be connected to the first sensing node SN1, and the other electrode of the third transistor T3-1 and T3-2 may be connected to a second power source VSS. The third transistor T3-1 and T3-2 may be implemented with the N-type transistor. The gate electrode of the third transistor T3-1 and T3-2 may be connected to the initialization line RSL. The third transistor T3-1 and T3-2 may include two sub-transistors T3-1 and T3-2 (e.g., connected in series), as shown in FIG. 16.

An input end of the second inverter INV2 may be connected to the first sensing node SN1, and the output end of the second inverter INV2 may be connected to the gate electrode of the second transistor T2.

An input end of a third inverter INV3 may be connected to the first sensing node SN1.

An input end of a fourth inverter INV4 may be connected to an output end of the third inverter INV3, and the fourth inverter INV4 may output the first mode signal. For example, an output end of the fourth inverter INV4 may be connected to the mode line ML.

Figure 17:
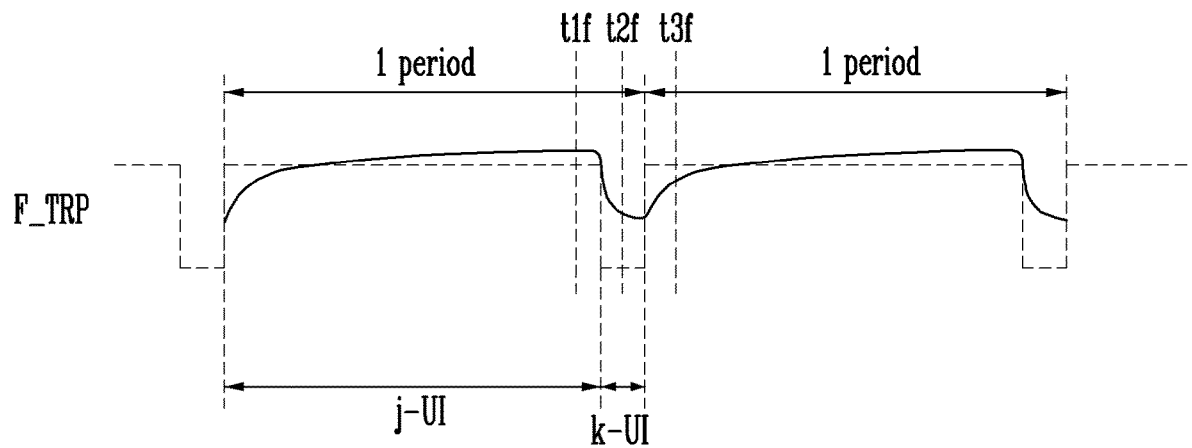
FIG. 17 is a diagram illustrating a first training pattern signal to be used in the transition detector of FIG. 16.

FIG. 17 is a diagram illustrating a first training pattern signal to be used in the transition detector of FIG. 16.

A dotted line waveform of FIG. 17 means a waveform of a first training pattern signal F_TRP when the first training pattern signal F_TRP passes through an theoretically ideal channel, and a solid line waveform of FIG. 17 means a waveform of the first training pattern signal F_TRP when the first training pattern signal F_TRP passes through an actual channel.

One period of the first training pattern signal F_TRP may be j+k-UI (e.g., j-UI+k-UI), and a binary level during a j-UI and a binary level during a k-UI may be different from each other. Here, j and k may be natural numbers.

According to an embodiment, k may be 1. For example, the first training pattern signal F_TRP may include a falling pulse during 1 UI in the one period, and may maintain the high level during the other UIs in the one period.

Because a voltage is charged in the channel without occurrence of a transition during the j-UI, a first transition (falling transition) may not sufficiently occur during a short k-UI. That is, the first training pattern signal F_TRP of FIG. 17 may be the worst case in the problem of inter-symbol interference in the falling transition.

Thus, when the first training pattern signal F_TRP that is the worst case is simultaneously transmitted to all channels (even mode), and when a phase of the sampling clock signal is determined to detect the first transition in the sensing channel, the phase of the sampling clock signal strong against both the crosstalk-induced jitter and the inter-symbol interference can be obtained.

According to the present embodiment, it is unnecessary to apply a pre-emphasis technique to the transmitting units TX1 to TX(2n−1), and thus construction cost can be reduced.

Figure 18:
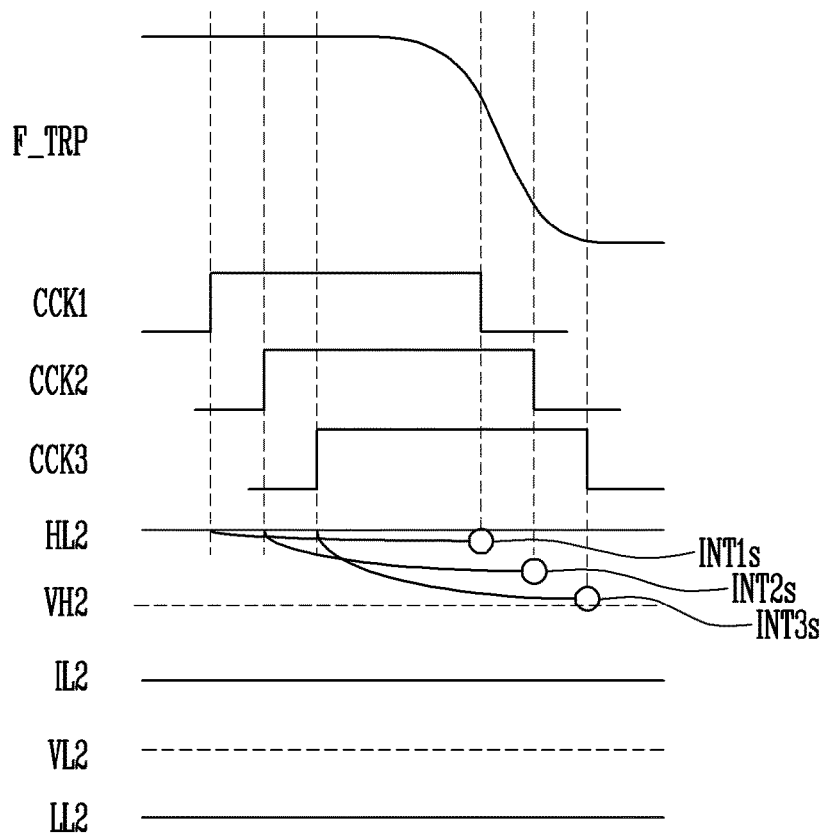
FIGS. 18 to 20 are diagrams illustrating an operation of the transition detector of FIG. 16, based on the first training pattern signal.
Figure 19:
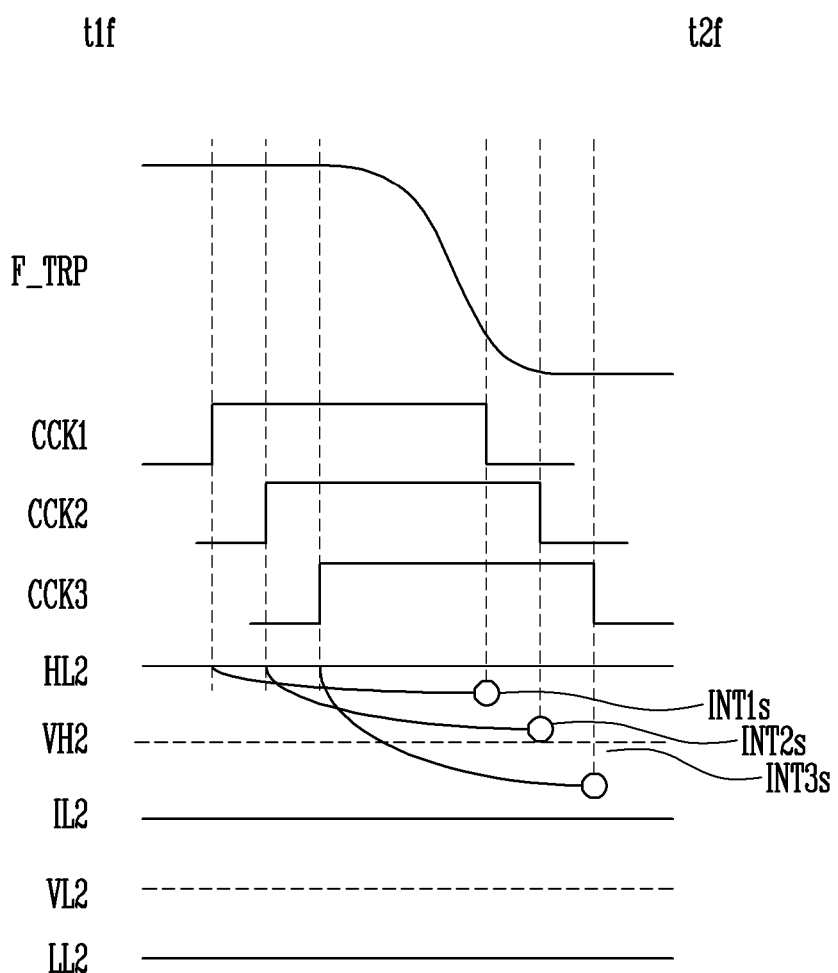
Figure 20:
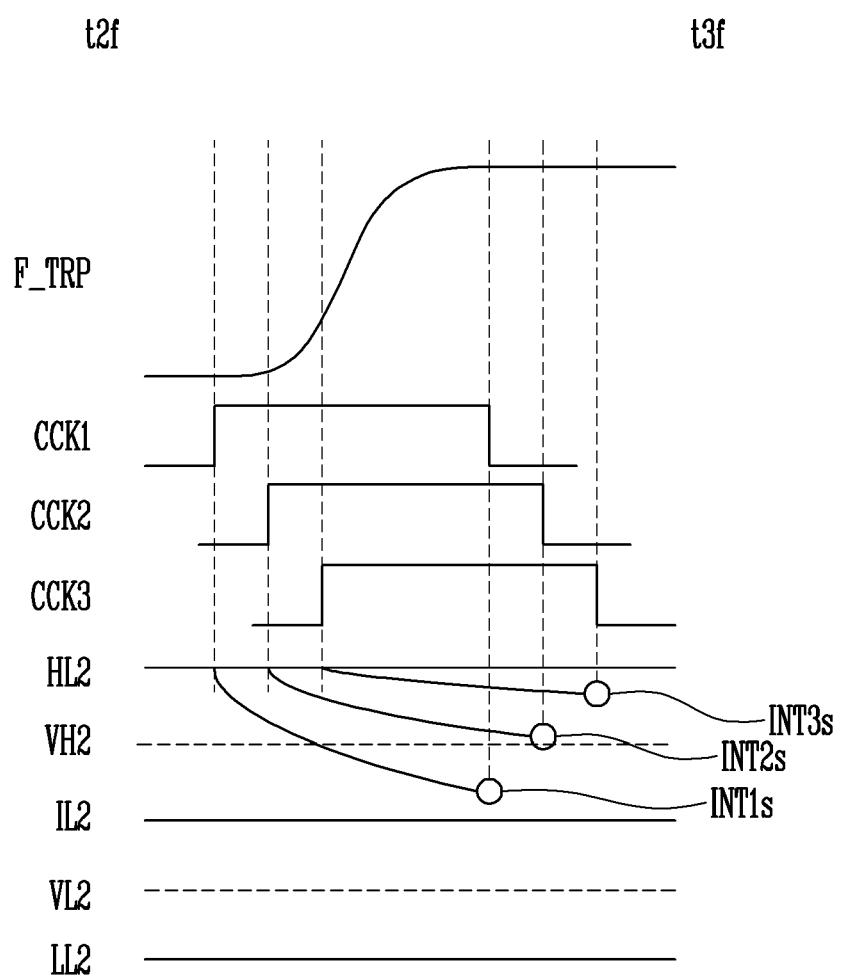

FIGS. 18 to 20 are diagrams illustrating an operation of the transition detector of FIG. 16, based on the first training pattern signal.

For example, FIGS. 18 and 19 are diagrams illustrating an operation of the transition detector F_TDU during a period of t1f to t2f of FIG. 17, and FIG. 20 is a diagram illustrating an operation of the transition detector F_TDU during a period of t2f to t3f of FIG. 17.

The first reference voltage VH2 may have an intermediate value between a highest level HL2 and an intermediate level IL2 among changeable levels of integral signals INT1s, INT2s, and INT3s. A second reference voltage VL2 may have an intermediate value between a lowest level LL2 and the intermediate level IL2 among the changeable levels of the integral signals INT1s, INT2s, and INT3s. The voltages HL2, VH2, IL2, VL2, and LL2 may be equal to or different from those HL1, VH1, IL1, VL1, and LL1 described with reference to FIGS. 2 and 3.

The transition detector F_TDU may detect the occurrence of a transition of the first training pattern signal F_TRP when a first integral signal INT1s and a second integral signal INT2s are larger than the first reference voltage VH2, and a third integral signal INT3s is smaller than the first reference voltage VH2.

For example, the first integrator INT1 may generate the first integral signal INT1s by integrating the first training pattern signal F_TRP during the period in which the first compensation clock signal CCK1 has the high level. In addition, the second integrator INT2 may generate the second integral signal INT2s by integrating the first training pattern signal F_TRP during the period in which the second compensation clock signal CCK2 has the high level. In addition, the third integrator INT3 may generate a third integral signal INT3s by integrating the first training pattern signal F_TRP during the period in which the third compensation clock signal CCK3 has the high level.

In some embodiments, the integrators INT1, INT2, and INT3 may be initialized when the corresponding compensation clocks CCK1, CCK2, and CCK3 have the low level, so that output values of the integrators INT1, INT2, and INT3 are initialized to the highest level HL2.

In FIGS. 18 and 19 (i.e., in the period from t1$f$ to t2$f$), the first integral signal INT1s is larger than the second integral signal INT2s, and the second integral signal INT2s is larger than the third integral signal INT3s.

In FIG. 18, because the first to third integral signals INT1s, INT2s, and INT3s are larger than the first reference voltage VH2, the first to third comparators CP1, CP2, and CP3 all output the logic value 1. Therefore, the first NAND gate NAND1 outputs the logic value 0, and the first NOR gate NOR1 outputs the logic value 0. Thus, the first inverter INV1 outputs the logic value 1 as the first detection signal, and the first transistor T1 maintains a turn-off state. Accordingly, in FIG. 18, the first mode signal of the training mode is continuously output, and the phases of the first to third compensation clock signals CCK1, CCK2, and CCK3 can be changed and adjusted by the phase corrector PCU.

In FIG. 19, the first and second integral signals INT1s and INT2s are larger than the first reference voltage VH2, and the third integral signal INT3s is smaller than the first reference voltage VH2. Therefore, the first and second comparators CP1 and CP2 output the logic value 1, and the third comparator CP3 outputs the logic value 0. Thus, the first NAND gate NAND1 outputs the logic value 0, and the first NOR gate NOR1 outputs the logic value 1. Accordingly, the first inverter INV1 outputs the logic value 0 as the first detection signal, and the first transistor T1 is turned on.

Accordingly, the voltage of the first power source VDD is charged in the first sensing node SN1, and the logic value 1 is output as the first mode signal by the third and fourth inverters INV3 and INV4, collectively. The logic value 1 of the first mode signal may mean the normal mode, and the logic value 0 of the first mode signal may mean the training mode. Therefore, the phase corrector PCU may generate a sampling clock signal having the same phase as the third compensation clock signal CCK3.

Subsequently, although the first transistor T1 is turned on or turned off due to a change in logic value of the first detection signal, the turn-on state of the second transistor T2 is maintained by the second inverter INV2, and hence the voltage of the first sensing node SN1 is maintained. Thus, the first mode signal of the normal mode is continuously output regardless of a change in logic value of the first detection signal.

Additionally, a case where the integrators INT1, INT2, and INT3 operate is described in FIG. 20. In the period of t2$f$ to t3$f$, the second integral signal INT2s is larger than the first integral signal INT1s, and the third integral signal INT3s is larger than the second integral signal INT2s.

In FIG. 20, the second and third comparators CP2 and CP3 output the logic value 1, the first comparator CP1 outputs the logic value 0, and the first detection signal becomes 1. Thus, the first transistor T1 is in the turn-off state.

Figure 21:
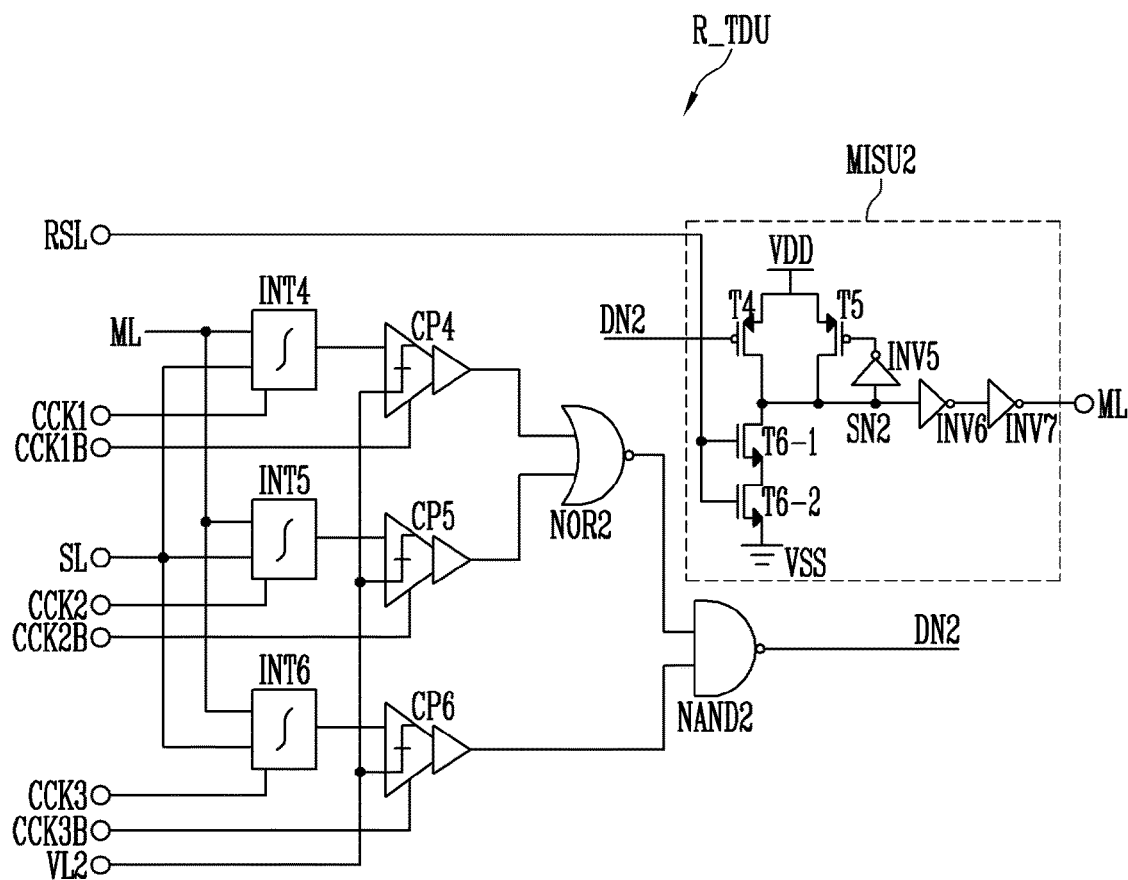
FIG. 21 is a diagram illustrating a transition detector according to another embodiment of the present disclosure.

FIG. 21 is a diagram illustrating a transition detector according to another embodiment of the present disclosure.

Referring to FIG. 21, the transition detector R_TDU according to another embodiment of the present disclosure may include integrators INT4, INT5, and INT6, comparators CP4, CP5, and CP6, a second NAND gate NAND2, a second NOR gate NOR2, and a second mode signal maintainer MISU2.

The transition detector R_TDU may receive first to third compensation clock signals CCK1, CCK2, and CCK3 as the above-described compensation clock signal Comp_CLK. The second compensation clock signal CCK2 may have a phase further delayed than that of the first compensation clock signal CCK1, and the third compensation clock signal CCK3 may have a phase further delayed than that of the second compensation clock signal CCK2. A phase difference between the second compensation clock signal CCK2 and the first compensation clock signal CCK1 may be equal to that between the third compensation clock signal CCK3 and the second compensation clock signal CCK2.

Also, the transition detector R_TDU may receive a second training pattern signal through the sensing line SL.

A fourth integrator INT4 may provide a fourth integral signal by integrating the second training pattern signal according to the first compensation clock signal CCK1. For example, the fourth integrator INT4 may provide the fourth integral signal by integrating the second training pattern signal during a period in which the first compensation clock signal CCK1 has the high level.

A fifth integrator INT5 may provide a fifth integral signal by integrating the second training pattern signal according to the second compensation clock signal CCK2. For example, the fifth integrator INT5 may provide the fifth integral signal by integrating the second training pattern signal during a period in which the second compensation clock signal CCK2 has the high level.

A sixth integrator INT6 may provide a sixth integral signal by integrating the second training pattern signal according to the third compensation clock signal CCK3. For example, the sixth integrator INT6 may provide the sixth integral signal by integrating the second training pattern signal during a period in which the third compensation clock signal CCK3 has the high level.

In some embodiments, the integrators INT4, INT5, and INT6 may receive a second mode signal through the mode line ML. The integrators INT4, INT5, and INT6 may operate with the second mode signal of the training mode, and the operation of the integrators INT4, INT5, and INT6 with the second mode signal of the normal mode may be stopped.

A fourth comparator CP4 may output logic value 1 when the fourth integral signal is larger than a second reference voltage VL2, and may output the logic value 0 when the fourth integral signal is smaller than the second reference voltage VL2. For example, the fourth comparator CP4 may operate when an inverting signal CCK1B of the first compensation clock signal CCK1 has the high level to compare the fourth integral signal and the second reference voltage VL2.

A fifth comparator CP5 may output the logic value 1 when the fifth integral signal is larger than the second reference voltage VL2, and may output the logic value 0 when the fifth integral signal is smaller than the second reference voltage VL2. For example, the fifth comparator CP5 may operate when an inverting signal CCK2B of the second compensation clock signal CCK2 has the high level to compare the fifth integral signal and the second reference voltage VL2.

A sixth comparator CP6 may output the logic value 1 when the sixth integral signal is larger than the second reference voltage VL2, and may output the logic value 0 when the sixth integral signal is smaller than the second reference voltage VL2. For example, the sixth comparator CP6 may operate when an inverting signal CCK3B of the third compensation clock signal CCK3 has the high level to compare the sixth integral signal and the second reference voltage VL2.

In some embodiments, each of the fourth to sixth comparators CP4, CP5, and CP6 includes a latch at the latter end thereof to maintain an output value thereof during a certain period.

The second NOR gate NOR2 may receive output values of the fourth comparator CP4 and the fifth comparator CP5.

The second NAND gate NAND2 may receive output values of the second NOR gate NOR2 and the sixth comparator CP6, and may output a second detection signal. The second detection signal may be applied to a second detection node DN2.

The second mode signal maintainer MISU2 may provide the second mode signal of the training mode corresponding to an initialization signal having the turn-on level. The second mode signal maintainer MISU2 may receive the initialization signal through an initialization line RSL, and may provide the first mode signal through the mode line ML.

In some embodiments, the second mode signal maintainer MISU2 may provide the second mode signal of the normal mode corresponding to the second detection signal having a first turn-on level after the initialization signal having the turn-on level is supplied, and then may maintain the second mode signal of the normal mode regardless of a change in level of the second detection signal.

That is, when the second mode signal maintainer MISU2 starts providing the second mode signal of the normal mode, based on the second detection signal, the second mode signal maintainer MISU2 may continuously provide the second mode signal of the normal mode regardless of a subsequent change in level of the second detection signal. In the present embodiment, in order for the second mode signal maintainer MISU2 to provide the second mode signal of the training mode, it is useful to receive the initialization signal having the turn-on level through the initialization line RSL.

In some embodiments, the second mode signal maintainer MISU2 may include transistors T4, T5, T6-1, and T6-2 and inverters INV5, INV6, and INV7.

The second detection signal may be applied to a gate electrode of a fourth transistor T4, one electrode of the fourth transistor T4 may be connected to a first power source VDD, and the other electrode of the fourth transistor T4 may be connected to a second sensing node SN2. The fourth transistor T4 may be implemented with a P-type transistor. The gate electrode of the fourth transistor T4 may be connected to the second detection node DN2.

A gate electrode of a fifth transistor T5 may be connected to an output end of a fifth inverter INV5, one electrode of the fifth transistor T5 may be connected to the first power source VDD, and the other electrode of the fifth transistor T5 may be connected to the second sensing node SN2. The fifth transistor T5 may be implemented with the P-type transistor.

The initialization signal is applied to a gate electrode of the sixth transistor T6-1 and T6-2, one electrode of the sixth transistor T6-1 and T6-2 may be connected to the second sensing node SN2, and the other electrode of the sixth transistor T6-1 and T6-2 may be connected to a second power source VSS. The sixth transistor T6-1 and T6-2 may be implemented with an N-type transistor. The gate electrode of the sixth transistor T6-1 and T6-2 may be connected to the initialization line RSL. The sixth transistor T6-1 and T6-2 may include two sub-transistors T6-1 and T6-2 (e.g., connected in series) as shown in FIG. 21.

An input end of the fifth inverter INV5 may be connected to the second sensing node SN2, and the output end of the fifth inverter INV5 may be connected to the gate electrode of the fifth transistor T5.

An input end of a sixth inverter INV6 may be connected to the second sensing node SN2.

An input end of a seventh inverter INV7 may be connected to an output end of the sixth inverter INV6, and may output the second mode signal. For example, an output end of the seventh inverter INV7 may be connected to the mode line ML.

Figure 22:
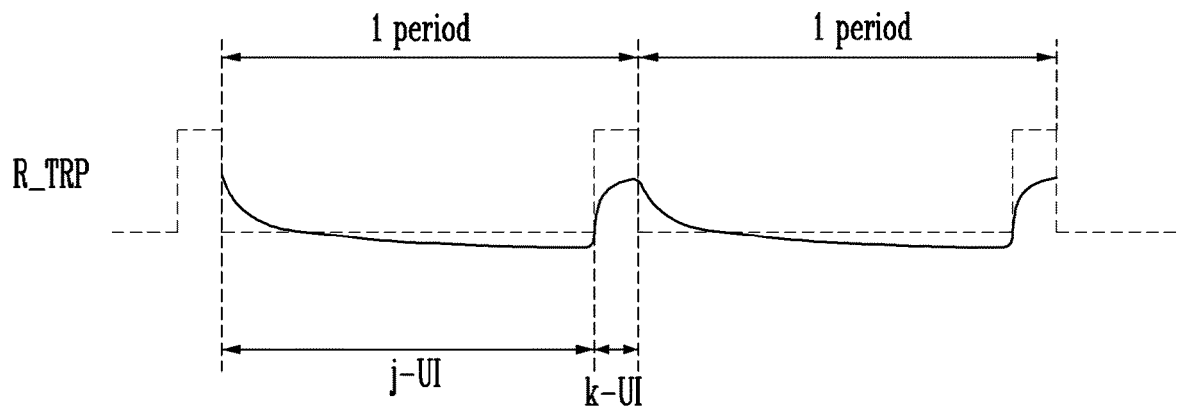
FIG. 22 is a diagram illustrating a second training pattern signal to be used in the transition detector of FIG. 21.

FIG. 22 is a diagram illustrating a second training pattern signal to be used in the transition detector of FIG. 21.

A dotted line waveform of FIG. 22 means a waveform of a second training pattern signal R_TRP when the second training pattern signal R_TRP passes through a theoretical ideal channel, and a solid line waveform of FIG. 22 means a waveform of the second training pattern signal R_TRP when the second training pattern signal R_TRP passes through an actual channel.

One period of the second training pattern signal R_TRP may be j+k-UI, and a binary level during a j-UI period and a binary level during a k-UI period may be different from each other. Here, j and k may be natural numbers.

According to an embodiment, k may be 1. For example, the second training pattern signal R_TRP may include a rising pulse during 1 UI in the one period, and may maintain the low level during the other UIs in the one period.

Because a voltage is charged in the channel without occurrence of a transition during the j-UI, a second transition (rising transition) may not sufficiently occur during a relatively short k-UI. That is, the second training pattern signal R_TRP of FIG. 22 may be the worst case in the problem of inter-symbol interference in the rising transition.

Thus, when the second training pattern signal R_TRP that is the worst case is simultaneously transmitted to all channels (even mode), and a phase of the sampling clock signal is determined to detect the second transition in the sensing channel, the phase of the sampling clock signal that is strong against both the crosstalk-induced jitter and the inter-symbol interference can be obtained.

According to the present embodiment, it is unnecessary to apply the pre-emphasis technique to the transmitting units TX1 to TX(2n−1), and thus construction cost can be reduced.

The transition detector R_TDU of FIG. 21 may detect occurrence of a transition of the second training pattern R_TRP when the fourth integral signal and the fifth integral signal are smaller than the second reference voltage VL2, and when the sixth integral signal is larger than the second reference voltage VL2. A detailed operation of the transition detector R_TDU is similar to the transition detector F_TDU of FIG. 16, and therefore, overlapping descriptions will be omitted. Because the first training pattern signal F_TRP maintains the high level for a relatively long time, the transition detector F_TDU may operate based on the first reference voltage VH2. Because the second training pattern signal R_TRP maintains the low level for a relatively long time, the transition detector R_TDU may operate based on the second reference voltage VL2.

As has been described so far, the transition detector TDU of FIG. 15 may be configured with any one of the transition detector F_TDU of FIG. 16 and the transition detector R_TDU of FIG. 22.

According to another embodiment, the transition detector TDU of FIG. 15 may be configured to include both transition detectors F_TDU and R_TDU.

For example, the data clock recovery unit CDR may transmit the first mode signal of the training mode to the mode line ML. When the first mode of the training mode is received, the transmitting units TX1 to TX(2n-1) may transmit the first training pattern signal F_TRP.

Accordingly, the clock data recovery unit CDR operates the transition detector F_TDU, and the first mode signal of the normal mode may be output to the mode line ML. The clock data recovery unit CDR may store the phase of the third compensation clock signal CCK3 as a first phase.

Next, the clock data recovery unit CDR may transmit the second mode signal of the training mode to the mode line ML. When the second mode signal of the training mode is received, the transmitting units TX1 to TX(2n-1) may transmit the second training pattern signal R_TRP.

Accordingly, the clock data recovery unit CDR operates the transition detector R_TDU, and the second mode signal of the normal mode may be output to the mode line ML. The clock data recovery unit CDR may store the phase of the third compensation clock signal CCK3 as a second phase.

The clock data recovery unit CDR may provide, as a sampling clock signal, the third compensation clock signal CCK3 having a phase, which is further delayed one among the first phase and the second phase. The reason why the further delayed phase is selected refers to the description of FIGS. 12 and 14. According to the present embodiment, the phase of a sampling clock signal that is resilient against both the falling transition and the rising transition can be obtained.

In the transition detector and the clock data recovery unit including the same according to the present disclosure, a clock signal that is strong against inter-symbol interference and crosstalk-induced jitter can be recovered.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, with functional equivalents thereof to be included.

What is claimed is:

1. A transition detector comprising:
a first integrator configured to provide a first integral signal by integrating a first training pattern signal according to a first compensation clock signal;
a second integrator configured to provide a second integral signal by integrating the first training pattern signal according to a second compensation clock signal; and
a third integrator configured to provide a third integral signal by integrating the first training pattern signal according to a third compensation clock signal,
wherein occurrence of a transition of the first training pattern signal is detected in a single case when the first integral signal and the second integral signal are larger than, and the third integral signal is smaller than, a first reference voltage, and
wherein occurrence of the transition of the first training pattern signal is not detected in other cases.

2. The transition detector of claim 1, wherein the second compensation clock signal has a phase that is further delayed than that of the first compensation clock signal, and
wherein the third compensation clock signal has a phase that is further delayed than that of the second compensation clock signal.

3. The transition detector of claim 2, further comprising:
a first comparator configured to output a logic value of 1 when the first integral signal is larger than the first reference voltage, and to output a logic value of 0 when the first integral signal is smaller than the first reference voltage;
a second comparator configured to output the logic value of 1 when the second integral signal is larger than the first reference voltage, and to output the logic value of 0 when the second integral signal is smaller than the first reference voltage; and
a third comparator configured to output the logic value of 1 when the third integral signal is larger than the first reference voltage, and to output the logic value of 0 when the third integral signal is smaller than the first reference voltage.

4. A transition detector comprising:
a first integrator configured to provide a first integral signal by integrating a first training pattern signal according to a first compensation clock signal;
a second integrator configured to provide a second integral signal by integrating the first training pattern signal according to a second compensation clock signal;
a third integrator configured to provide a third integral signal by integrating the first training pattern signal according to a third compensation clock signal;
a first comparator configured to output a logic value of 1 when the first integral signal is larger than a first reference voltage, and to output a logic value of 0 when the first integral signal is smaller than the first reference voltage;
a second comparator configured to output the logic value of 1 when the second integral signal is larger than the first reference voltage, and to output the logic value of 0 when the second integral signal is smaller than the first reference voltage;
a third comparator configured to output the logic value of 1 when the third integral signal is larger than the first reference voltage, and to output the logic value of 0 when the third integral signal is smaller than the first reference voltage;
a first NAND gate configured to receive output values of the first comparator and the second comparator; and a first NOR gate configured to receive output values of the first NAND gate and the third comparator,
wherein occurrence of a transition of the first training pattern signal is detected when the first integral signal and the second integral signal are larger than, and the third integral signal is smaller than, the first reference voltage,
wherein the second compensation clock signal has a phase that is further delayed than that of the first compensation clock signal, and
wherein the third compensation clock signal has a phase that is further delayed than that of the second compensation clock signal.

5. The transition detector of claim 4, further comprising a first inverter configured to output a first detection signal by inverting an output value of the first NOR gate.

6. The transition detector of claim 5, further comprising a first mode signal maintainer configured to provide a first mode signal of a training mode corresponding to an initialization signal having a turn-on level, and configured to provide the first mode signal of a normal mode corresponding to the first detection signal having a first turn-on level after the initialization signal having the turn-on level is supplied, and to then maintain the first mode signal of the normal mode regardless of a change in level of the first detection signal.

7. The transition detector of claim 6, wherein the first mode signal maintainer comprises:
a first transistor having a gate electrode configured to receive the first detection signal, one electrode connected to a first power source, and another electrode connected to a first sensing node;
a second transistor having one electrode connected to the first power source, and another electrode connected to the first sensing node;
a third transistor having a gate electrode configured to receive the initialization signal, one electrode connected to the first sensing node, and another electrode connected to a second power source; and
a second inverter having an input end connected to the first sensing node, and an output end connected to a gate electrode of the second transistor.

8. The transition detector of claim 7, wherein the first mode signal maintainer further comprises:
a third inverter having an input end connected to the first sensing node; and
a fourth inverter having an input end connected to an output end of the third inverter, and configured to output the first mode signal.

9. The transition detector of claim 8, further comprising:
a fourth integrator configured to provide a fourth integral signal by integrating a second training pattern signal according to the first compensation clock signal;
a fifth integrator configured to provide a fifth integral signal by integrating the second training pattern signal according to the second compensation clock signal; and
a sixth integrator configured to provide a sixth integral signal by integrating the second training pattern signal according to the third compensation clock signal,
wherein occurrence of a transition of the second training pattern signal is detected when the fourth integral signal and the fifth integral signal are smaller than, and the sixth integral signal is larger than, a second reference voltage.

10. The transition detector of claim 9, further comprising:
a fourth comparator configured to output the logic value of 1 when the fourth integral signal is larger than the second reference voltage, and to output the logic value of 0 when the fourth integral signal is smaller than the second reference voltage;
a fifth comparator configured to output the logic value of 1 when the fifth integral signal is larger than the second reference voltage, and to output the logic value of 0 when the fifth integral signal is smaller than the second reference voltage; and
a sixth comparator configured to output the logic value of 1 when the sixth integral signal is larger than the second reference voltage, and to output the logic value of 0 when the sixth integral signal is smaller than the second reference voltage.

11. The transition detector of claim 10, further comprising:
a second NOR gate configured to receive output values of the fourth comparator and the fifth comparator; and
a second NAND gate configured to receive output values of the second NOR gate and the sixth comparator, and to output a second detection signal.

12. The transition detector of claim 11, further comprising a second mode signal maintainer configured to provide a second mode signal of the training mode, corresponding to the initialization signal having the turn-on level, and configured to provide the second mode signal of the normal mode corresponding to the second detection signal having a first turn-on level after the initialization signal having the turn-on level is supplied, and to then maintain the second mode signal of the normal mode regardless of a change in level of the second detection signal.

13. The transition detector of claim 12, wherein the second mode signal maintainer comprises:
a fourth transistor having a gate electrode configured to receive the second detection signal, one electrode connected to the first power source, and another electrode connected to a second sensing node;
a fifth transistor having one electrode connected to the first power source, and another electrode connected to the second sensing node;
a sixth transistor having a gate electrode configured to receive the initialization signal, one electrode connected to the second sensing node, and another electrode connected to the second power source; and
a fifth inverter having an input end connected to the second sensing node, and an output end connected to a gate electrode of the fifth transistor.

14. The transition detector of claim 13, wherein the second mode signal maintainer further comprises:
a sixth inverter having an input end connected to the second sensing node; and
a seventh inverter having an input end connected to an output end of the sixth inverter, and configured to output the second mode signal.

15. The transition detector of claim 14, wherein the first training pattern signal comprises a falling pulse during 1 unit interval in one period, and maintains a high level during other unit intervals in the one period, and
wherein the second training pattern signal comprises a rising pulse during 1 unit interval in one period, and maintains a low level during the other unit intervals in the one period.

16. The transition detector of claim 15, wherein the first training pattern signal comprises a falling pulse during 1 unit interval in one period, and
wherein the second training pattern signal comprises a rising pulse during 1 unit interval in one period.

17. A clock data recovery unit comprising:

a first integrator configured to provide a first integral signal by integrating a first training pattern signal according to a first compensation clock signal;

a second integrator configured to provide a second integral signal by integrating the first training pattern signal according to a second compensation clock signal having a phase further delayed than that of the first compensation clock signal; and a third integrator configured to provide a third integral signal by integrating the first training pattern signal according to a third compensation clock signal having a phase further delayed than that of the second compensation clock signal, wherein the phase of the third compensation clock signal is stored as a first phase in a single case when the first integral signal and the second integral signal are larger than, and the third integral signal is smaller than, a first reference voltage, and wherein the phase of the third compensation clock signal is not stored as the first phase in other cases.

18. The clock data recovery unit of claim 17, further comprising:

a fourth integrator configured to provide a fourth integral signal by integrating a second training pattern signal according to the first compensation clock signal;

a fifth integrator configured to provide a fifth integral signal by integrating the second training pattern signal according to the second compensation clock signal; and a sixth integrator configured to provide a sixth integral signal by integrating the second training pattern signal according to the third compensation clock signal, wherein the phase of the third compensation clock signal is stored as a second phase when the fourth integral signal and the fifth integral signal are smaller than, and the sixth integral signal is larger than, a second reference voltage.

19. The clock data recovery unit of claim 18, wherein the third compensation clock signal having a phase, which is further delayed one among the first phase and the second phase, is provided as a sampling clock signal.

20. The clock data recovery unit of claim 19, wherein the first training pattern signal comprises a falling pulse during 1 unit interval in one period, and maintains a high level during other unit intervals in the one period, and the second training pattern signal comprises a rising pulse during 1 unit interval in one period, and maintains a low level during the other unit intervals in the one period.

* * * * *